US011490038B2

(12) United States Patent
Okuike

(10) Patent No.: US 11,490,038 B2
(45) Date of Patent: Nov. 1, 2022

(54) SOLID-STATE IMAGING DEVICE, SOLID-STATE IMAGING METHOD, AND ELECTRONIC EQUIPMENT

(71) Applicant: SONY SEMICONDUCTOR SOLUTIONS CORPORATION, Kanagawa (JP)

(72) Inventor: Kazuyuki Okuike, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/309,420

(22) PCT Filed: Nov. 22, 2019

(86) PCT No.: PCT/JP2019/045744
§ 371 (c)(1),
(2) Date: May 26, 2021

(87) PCT Pub. No.: WO2020/116196
PCT Pub. Date: Jun. 11, 2020

(65) Prior Publication Data
US 2021/0400213 A1 Dec. 23, 2021

(30) Foreign Application Priority Data
Dec. 7, 2018 (JP) .............................. JP2018-229775

(51) Int. Cl.
*H04N 5/351* (2011.01)
*H04N 5/378* (2011.01)
(Continued)

(52) U.S. Cl.
CPC ........... *H04N 5/351* (2013.01); *G06V 40/166* (2022.01); *H04N 5/378* (2013.01); *H04N 5/3698* (2013.01)

(58) Field of Classification Search
CPC ...... H04N 5/351; H04N 5/378; H04N 5/3698; H04N 5/23219; H04N 5/23222;
(Continued)

(56) References Cited

U.S. PATENT DOCUMENTS

| 10,306,187 | B2 * | 5/2019 | Child | H04N 7/186 |
| 2004/0001074 | A1 * | 1/2004 | Oyaizu | G06T 15/10 |
| | | | | 345/629 |
| 2017/0272630 | A1 * | 9/2017 | Kobuse | H04N 5/2352 |

FOREIGN PATENT DOCUMENTS

| JP | 2003-218992 A | 7/2003 | |
| JP | 2003218992 A * | 7/2003 | .............. H04M 1/00 |

(Continued)

OTHER PUBLICATIONS

International Search Report and Written Opinion of PCT Application No. PCT/JP2019/045744, dated Feb. 4, 2020, 10 pages of ISRWO.

*Primary Examiner* — Nhan T Tran
(74) *Attorney, Agent, or Firm* — Chip Law Group

(57) ABSTRACT

There is provided a solid-state imaging device including an imaging unit (211) that captures a first captured image, a light emission controlling unit (271) that controls emission of light from the light emitting unit, a decision unit (2331) that decides whether or not the emission of light is detected from within the first captured image, and a transmission controlling unit (2333) that controls, when the emission of light is detected, transmission of a second captured image or data based on the second captured image.

20 Claims, 20 Drawing Sheets

(51) Int. Cl.
*H04N 5/369* (2011.01)
*G06V 40/16* (2022.01)

(58) Field of Classification Search
CPC .... H04N 5/2351; H04N 5/379; H04N 5/2354; H04N 5/2256; H04N 5/23229; G06V 40/166; G06V 10/82; G06V 20/10; G03B 7/091; G03B 15/05; G06F 21/31; G06F 21/6245; G06N 3/0454; G06N 3/08
See application file for complete search history.

(56) References Cited

FOREIGN PATENT DOCUMENTS

| | | |
|---|---|---|
| JP | 2015-133624 A | 7/2015 |
| JP | 2019-095385 A | 6/2019 |

\* cited by examiner

F I G . 3
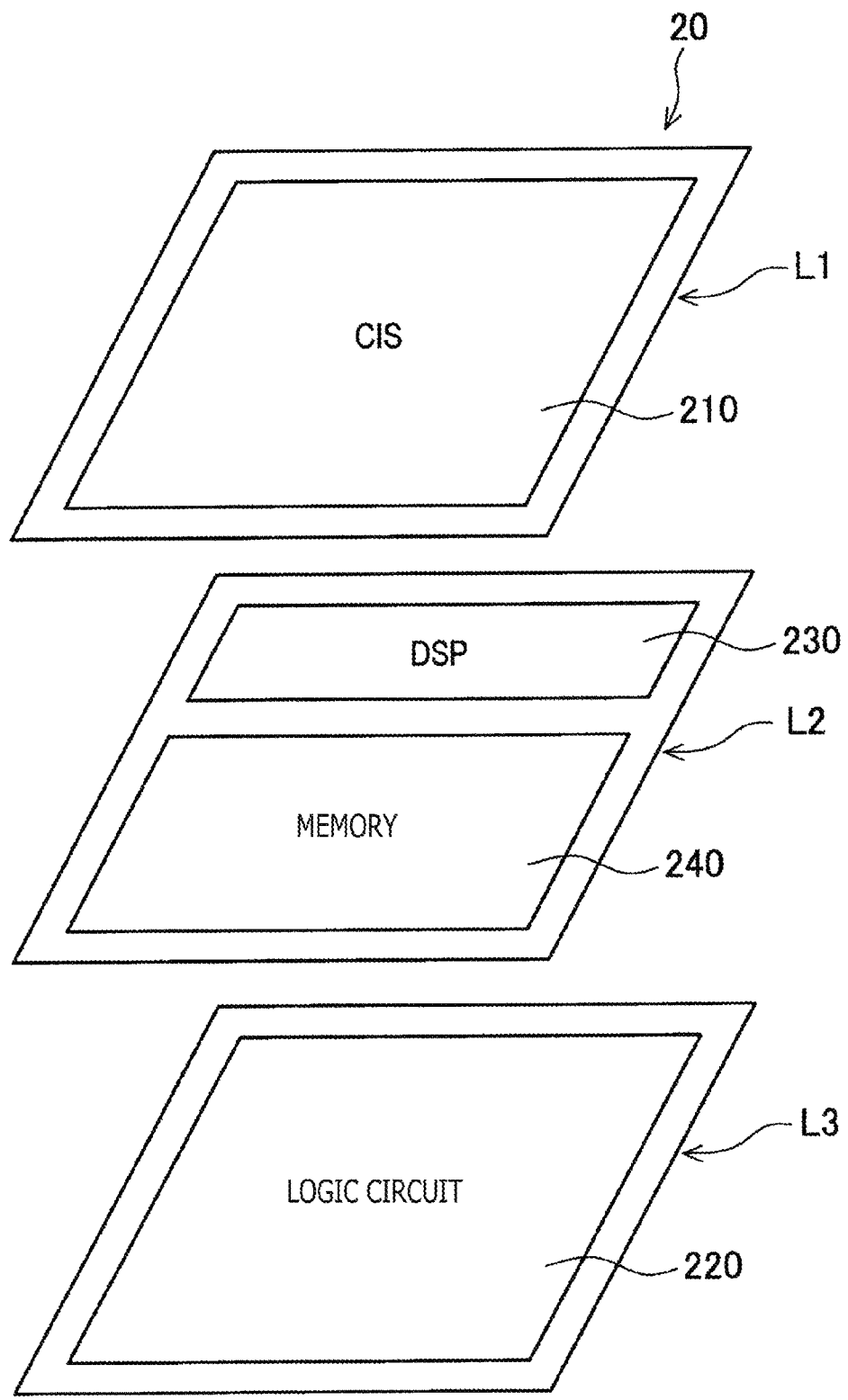

SOLID-STATE IMAGING DEVICE, SOLID-STATE IMAGING METHOD, AND ELECTRONIC EQUIPMENT

CROSS REFERENCE TO RELATED APPLICATIONS

This application is a U.S. National Phase of International Patent Application No. PCT/JP2019/045744 filed on Nov. 22, 2019, which claims priority benefit of Japanese Patent Application No. JP 2018-229775 filed in the Japan Patent Office on Dec. 7, 2018. Each of the above-referenced applications is hereby incorporated herein by reference in its entirety.

TECHNICAL FIELD

The present disclosure relates to a solid-state imaging device, a solid-state imaging method, and electronic equipment.

BACKGROUND ART

In recent years, a technology for enhancing privacy protection of a person imaged by a camera (hereinafter referred to also as an "imaging target") is known. For example, in order to prevent an imaging person from being imaged using a built-in camera of a cellular phone when the imaging person does not intend to do so, a technology for issuing, in the case where the built-in camera is in operation, a notification that the built-in camera is in operation is disclosed (for example, refer to PTL 1).

CITATION LIST

Patent Literature

[PTL 1]
Japanese Patent Laid-Open No. 2015-133624

SUMMARY

Technical Problem

However, it is demanded to provide a technology capable of further enhancing privacy protection of a person imaged by a camera.

Solution to Problem

According to the present disclosure, there is provided a solid-state imaging device including an imaging unit configured to capture a first captured image, a light emission controlling unit configured to control emission of light from the light emitting unit, a decision unit configured to decide whether or not the emission of light is detected from within the first captured image, and a transmission controlling unit configured to control, when the emission of light is detected, transmission of a second captured image or data based on the second captured image.

According to the present disclosure, there is provided a solid-state imaging method including capturing a first captured image, controlling emission of light from a light emitting unit, deciding whether or not the emission of light is detected from within the first captured image, and controlling, when the emission of light is detected, transmission of a second captured image or data based on the second captured image, by a processor.

According to the present disclosure, there is provided electronic equipment including an application, an imaging unit configured to capture a first captured image, a light emitting unit, a light emission controlling unit configured to control emission of light from the light emitting unit, a decision unit configured to decide whether or not the emission of light is detected from within the first captured image, and a transmission controlling unit configured to control, when the emission of light is detected, transmission of a second captured image or data based on the second captured image.

BRIEF DESCRIPTION OF DRAWINGS

FIG. 3 is a view depicting a second example of the structure of the image sensor.

DESCRIPTION OF EMBODIMENTS

Figure 1:
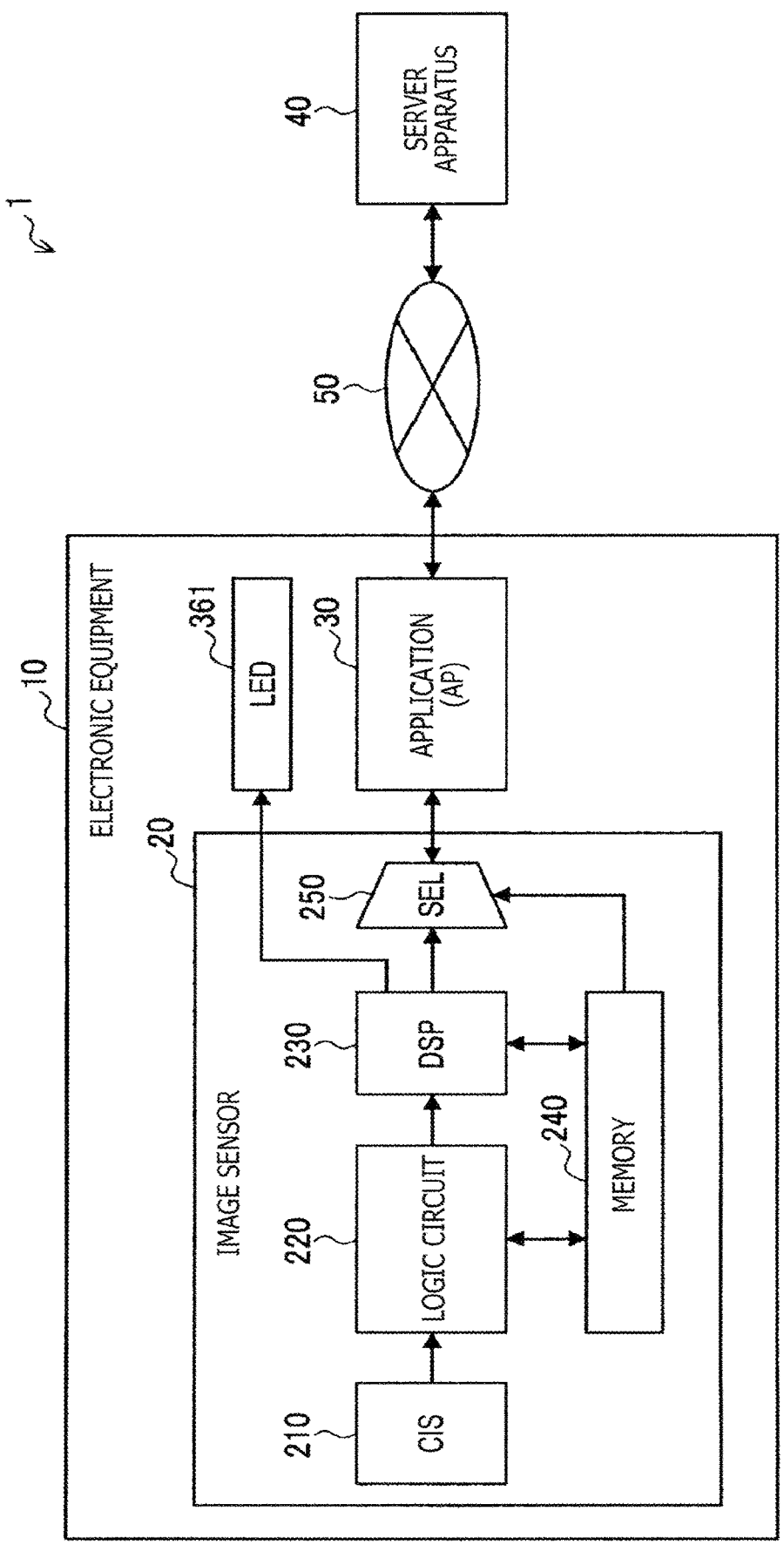
FIG. 1 is a view depicting a configuration example of a solid-state imaging system according to a first embodiment of the present disclosure.

In the following, preferred embodiments of the present disclosure are described in detail with reference to the drawings. It is to be noted that, in the present specification and the drawings, components having substantially the same functional configurations are denoted by the same reference signs, and overlapping description of them is omitted.

Further, in the present specification and the drawings, multiple components having substantially the same functional configurations are sometimes distinguished from each other by affixing different numerals to the same reference signs. However, in the case where it is not necessary to specifically distinguish multiple components having substantially the same functional configurations from each other, those components are denoted by only the same reference sign. Further, multiple components having the same or similar functional configurations are sometimes distinguished from each other by affixing different alphabetical letters to the same reference sign. However, in the case where there is no necessity to specifically distinguish multiple components having the same or similar functional configurations from each other, those components are denoted by only the same reference sign.

It is to be noted that description is given in the following order.

0. Overview
1. First Embodiment
1.1. Configuration Example of System
1.2. Configuration Example of Image Sensor
1.3. Detailed Configuration Example
2. Second Embodiment
3. Third Embodiment
4. Fourth Embodiment
5. Fifth Embodiment
6. Sixth Embodiment
7. Conclusion

0. Overview

In recent years, a technology for enhancing privacy protection of a person imaged by a camera (hereinafter referred to also as an "imaging target") is known. For example, in order to prevent an imaging person from being imaged using a built-in camera of a cellular phone when the imaging person does not intend to do so, a technology for issuing, in the case where the built-in camera is in operation, a notification that the built-in camera is in operation is disclosed. However, it is demanded to provide a technology capable of further enhancing privacy protection of a person imaged by a camera.

More particularly, according to the technology of issuing, in the case where the built-in camera is in operation, a notification that the built-in camera is in operation, there is the possibility that an application can be created by a malignant application creator such that, even if the built-in camera is in operation, the notification to this effect is not issued. Further, according to the technology of issuing, in the case where the built-in camera is in operation, a notification that the built-in camera is in operation, since data obtained by imaging of an imaging target is automatically transmitted to the outside of the image sensor, the privacy protection of the imaging target is not sufficient.

Therefore, in the embodiments of the present disclosure, description is given principally of a technology that can further enhance the privacy protection of an imaging target by controlling transmission of data obtained by imaging of the imaging target to the outside of the image sensor.

The overview of the embodiments of the present disclosure is such as described above.

1. First Embodiment

1.1. Configuration Example of System

Now, a configuration example of a solid-state imaging system according to a first embodiment of the present disclosure is described with reference to FIG. 1. Referring to FIG. 1, the solid-state imaging system 1 according to the first embodiment of the present disclosure includes electronic equipment 10, a server apparatus 40, and a network 50. The electronic equipment 10 and the server apparatus 40 are communicable with each other through the network 50. It is to be noted that, although the electronic equipment 10 is connected to the network 50 in the example depicted in FIG. 1, multiple pieces of electronic equipment 10 may be connected to the network 50 and each piece of the electronic equipment 10 may be communicable with the server apparatus 40 through the network 50.

The electronic equipment 10 includes an image sensor 20, an application 30, and an LED (Light Emitting Diode) 361. The image sensor 20 functions as an example of a solid-state imaging device and includes a CIS (Contact Image Sensor) 210, a logic circuit 220, a DSP (Digital Signal Processor) 230, a memory 240, and a selector 250.

Here, the CIS 210 corresponds to an example of an imaging unit and includes an imaging element, a light source, a light receiving lens, an A/D converter, and so forth. The logic circuit 220 includes a signal processing unit that performs signal processing for an output signal from the CIS 210 and so forth. Further, the first embodiment of the present disclosure principally assumes a case in which the electronic equipment 10 is a camera. However, the electronic equipment 10 is not limited to a camera if it is equipment having the image sensor 20 and may be any other kind of equipment (for example, a smartphone, a cellular phone, and so forth). Meanwhile, the application 30 is executed by a processor built in the electronic equipment 10. The LED 361 starts or stops emission of light under the control of the DSP 230. It is to be noted that, since the LED 361 is nothing but an example of the light emitting unit, another light emitting unit may be used in place of the LED 361.

In the first embodiment of the present disclosure, a video is captured by the image sensor 20. The video is obtained by the image sensor 20 successively capturing multiple frames (captured images). The first embodiment of the present disclosure principally assumes a case in which a frame (captured image) captured by the image sensor 20 or data (hereinafter referred to as "metadata") based on the frame (captured image) is transmitted to the server apparatus 40. However, as also hereinafter described, the transmission destination of a captured image or metadata may be the application 30 or may be a recording medium outside the electronic equipment 10.

The configuration example of the solid-state imaging system 1 according to the first embodiment of the present disclosure is such as described above.

1.2. Configuration Example of Image Sensor

Figure 2:
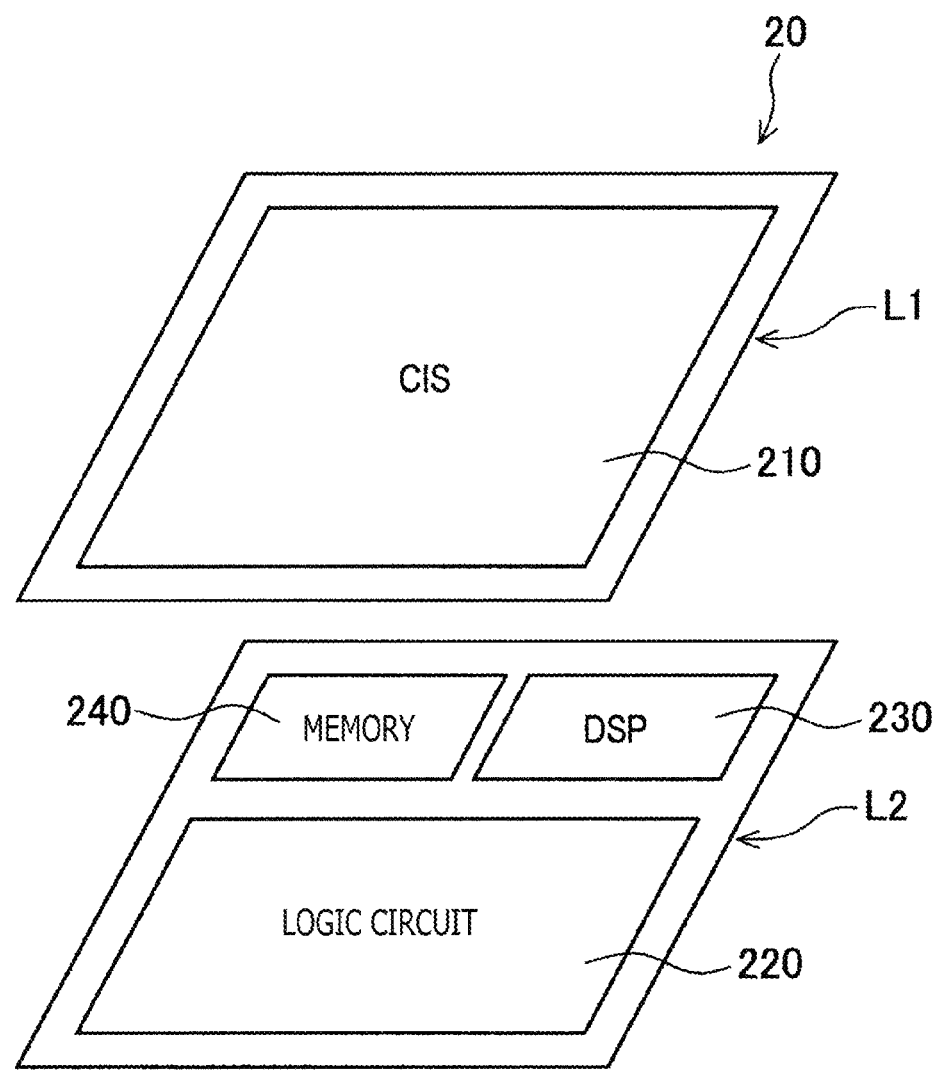
FIG. 2 is a view depicting a first example of a structure of an image sensor.

Subsequently, an example of a structure of the image sensor 20 according to the first embodiment of the present disclosure is described. FIG. 2 is a view depicting a first example of the structure of the image sensor 20. FIG. 3 is a view depicting a second example of the structure of the image sensor 20. Referring to FIG. 2, the image sensor 20 includes a first semiconductor chip L1 and a second semiconductor chip L2. Referring to FIG. 3, the image sensor 20 includes a first semiconductor chip L1, a second semiconductor chip L2, and a third semiconductor chip L3.

In such a manner, the image sensor 20 includes multiple semiconductor chips, and the multiple semiconductor chips are configured in a layered manner and are electrically connected to each other. The number of semiconductor chips included in the image sensor 20 is not limited to two and three, and may be one or four or more.

Referring to FIG. 2, the CIS 210 is included in the first semiconductor chip L1. Further, the memory 240, the DSP 230, and the logic circuit 220 are included in the second semiconductor chip L2. Referring to FIG. 3, the CIS 210 is included in the first semiconductor chip L1. Further, the memory 240 and the DSP 230 are included in the second semiconductor chip L2. The logic circuit 220 is included in the third semiconductor chip L3. However, the CIS 210, the memory 240, the DSP 230, and the logic circuit 220 may each be included in any semiconductor chip.

In the examples depicted in FIGS. 2 and 3, a local authentication unit 231 (first authentication unit) hereinafter described may be included in the second semiconductor chip L2. More particularly, the local authentication unit 231 (first authentication unit) may be implemented by the DSP 230 included in the second semiconductor chip L2. A data transmission decision unit 233 hereafter described may also be included in the second semiconductor chip L2. More particularly, the data transmission decision unit 233 may be implemented by the DSP 230 included in the second semiconductor chip L2.

Further, in the example depicted in FIG. 3, a signal processing unit 221 may be included in the logic circuit 220 of the third semiconductor chip L3. As an alternative, in the example depicted in FIG. 2, the signal processing unit 221 may be included in the logic circuit 220 of the second semiconductor chip L2. Further, in the example depicted in FIG. 3, a local authentication data storage unit 232 hereinafter described may be included in the memory 240 of the third semiconductor chip L3. As an alternative, in the example depicted in FIG. 2, the local authentication data storage unit 232 may be included in the memory 240 of the second semiconductor chip L2.

The examples of the structure of the image sensor 20 are such as described above.

1.3. Detailed Configuration Example

Figure 4:
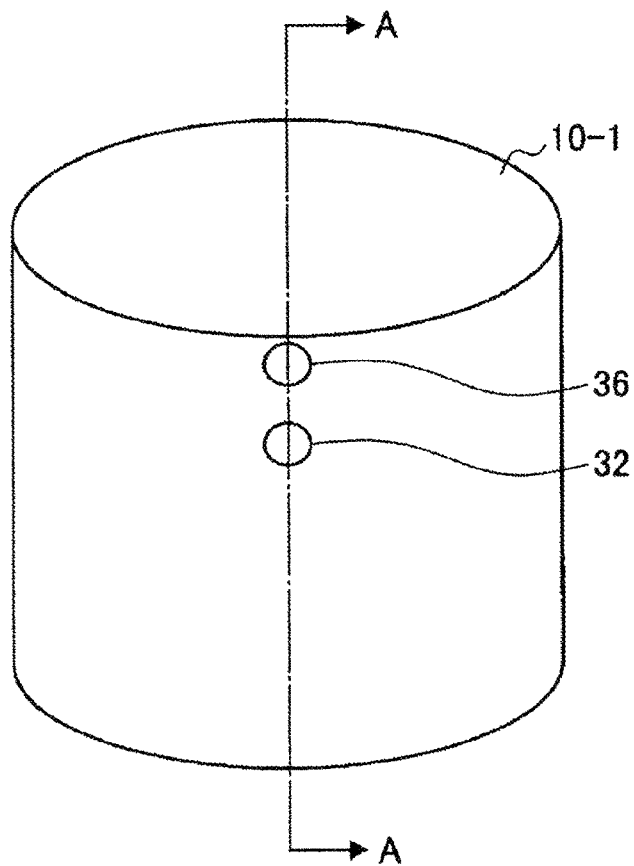
FIG. 4 is a view depicting a first example of an appearance configuration of electronic equipment.
Figure 5:
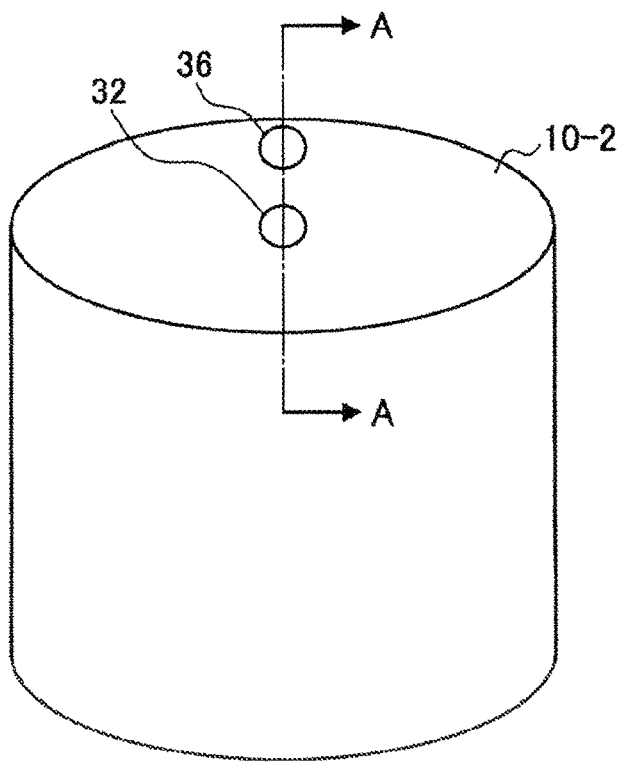
FIG. 5 is a view depicting a second example of the appearance configuration of the electronic equipment.

Now, a detailed configuration of the solid-state imaging system 1 according to the first embodiment of the present disclosure is described. FIG. 4 is a view depicting a first example of an appearance configuration of electronic equipment. FIG. 5 is a view depicting a second example of appearance configuration of the electronic equipment. As depicted in FIGS. 4 and 5, the electronic equipment 10 may have an appearance of a cylindrical shape as an example. However, the appearance shape of the electronic equipment 10 is not restrictive.

Referring to FIG. 4, in the first example, a camera module 32 and an LED module 36 are provided on a side face of electronic equipment 10-1. On the other hand, referring to FIG. 5, in the second example, the camera module 32 and the LED module 36 are provided on an upper face of electronic equipment 10-2. However, also the positions at which the camera module 32 and the LED module 36 are provided are not specifically restrictive.

Figure 6:
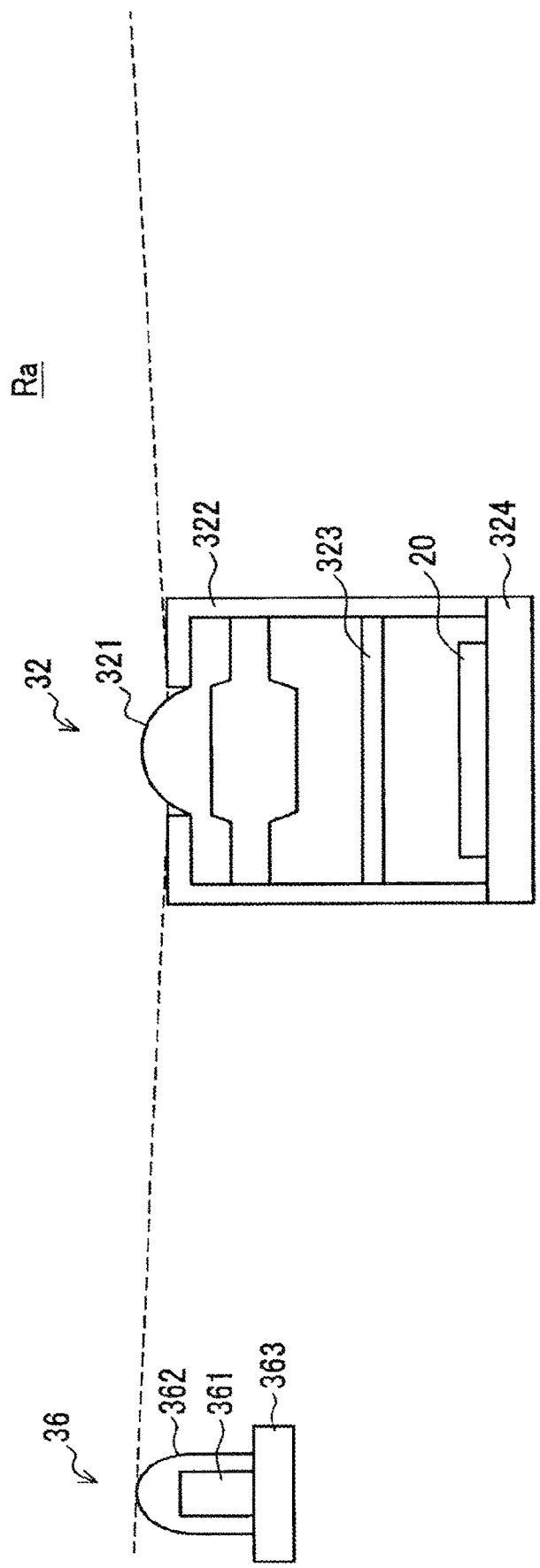
FIG. 6 is a sectional view taken along line A-A of a camera module and an LED module depicted in FIGS. 4 and 5.

FIG. 6 is a sectional view taken along line A-A of the camera module 32 and the LED module 36 depicted in FIGS. 4 and 5. Referring to FIG. 6, a sectional view of the camera module 32 and the LED module 36 is depicted. The camera module 32 includes an optical lens 321, a lens holder 322, an IR (infrared) cut filter 323, an image sensor 20, and a module board 324. The LED module 36 includes an LED 361, a light source lens 362, and a module board 363.

Here, a case is assumed in which a wide-angle lens is used as the optical lens 321. Therefore, in the example depicted in FIG. 6, light emitted from the LED 361 directly reaches the image sensor 20 from the LED 361 (light emitted from the LED 361 directly enters an imaging range Ra of the image sensor 20). However, light emitted from the LED 361 may otherwise be reflected by a predetermined reflection member and reach the image sensor 20 (light emitted from the LED 361 may be reflected by a predetermined reflection member and enter the imaging range Ra).

Figure 7:
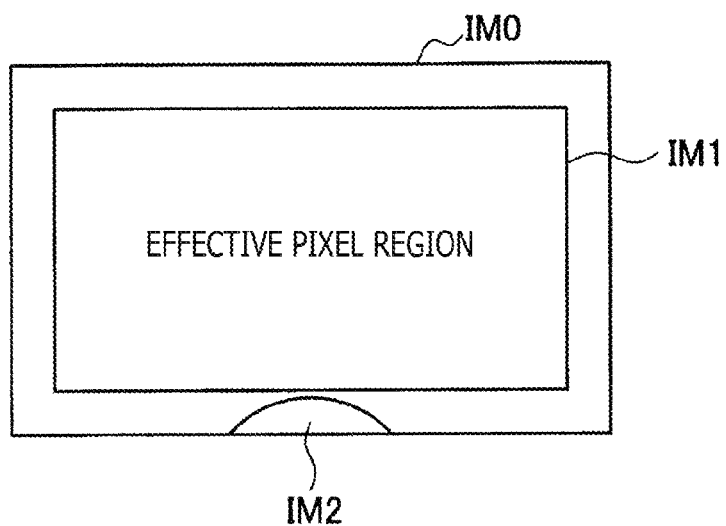
FIG. 7 is a view depicting an example of a captured image by the image sensor.

FIG. 7 is a view depicting an example of a captured image by the image sensor 20. Referring to FIG. 7, a captured image IM0 by the image sensor 20 is depicted. The captured image IM0 includes an effective pixel region IM1 and a peripheral region thereof. In order to prevent luminance in the effective pixel region IM1 from becoming excessively high, it is desirable that light emitted from the LED 361 does not very much reach the effective pixel region IM1. On the other hand, in the peripheral region, a light detection region IM2 in which light emitted from the LED 361 is imaged exists. Therefore, whether or not the LED 361 is emitting light can be detected on the basis of luminance in the light detection region IM2.

Figure 8:
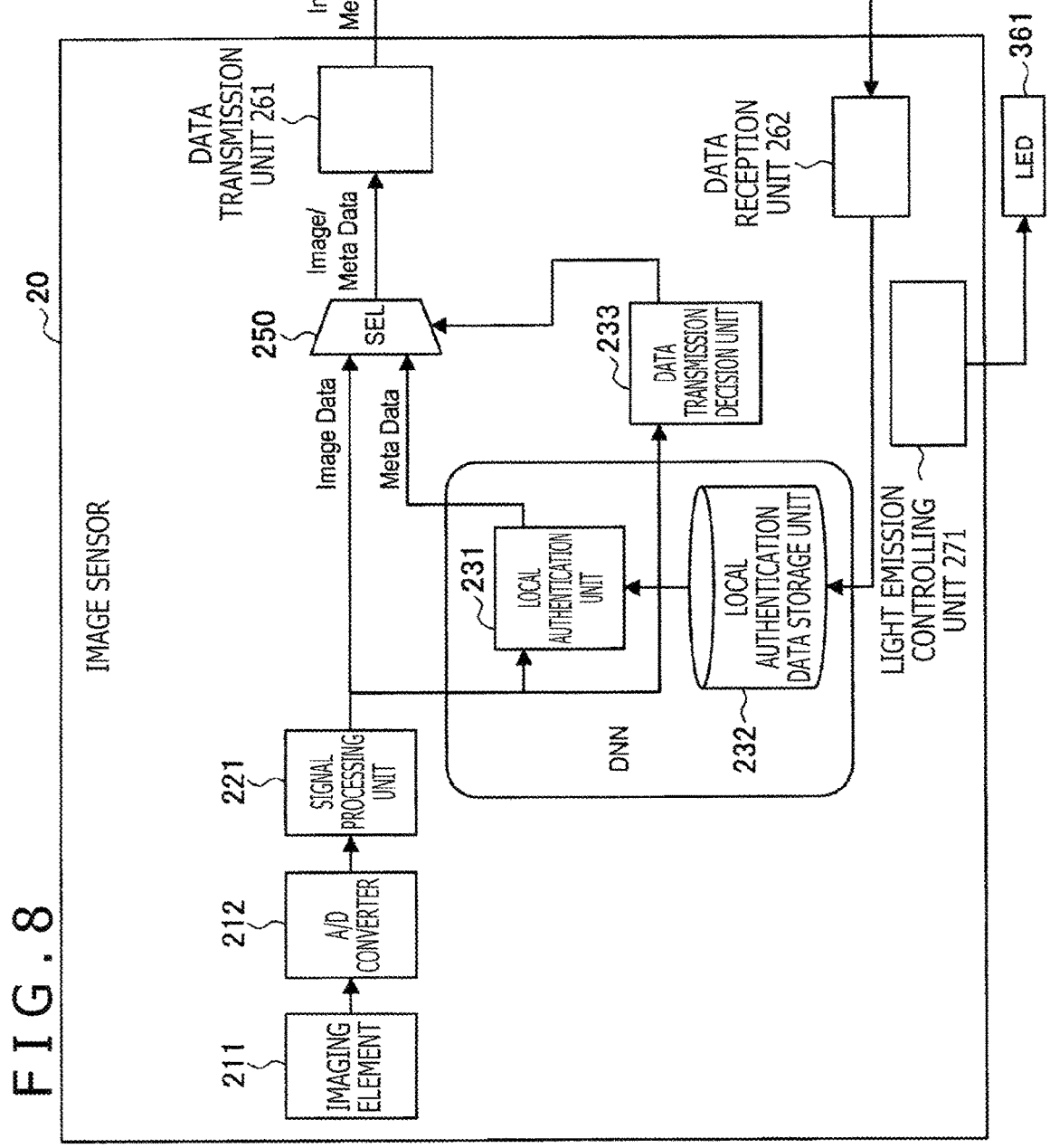
FIG. 8 is a view depicting a detailed configuration example of the solid-state imaging system according to the first embodiment of the present disclosure.

FIG. 8 is a detailed configuration example of the solid-state imaging system 1 according to the first embodiment of the present disclosure. It is to be noted that, in FIG. 8 and subsequent drawings, the application 30 and the network 50 are omitted for the convenience of illustration. Referring to FIG. 8, the image sensor 20, the server apparatus 40, and the LED 361 are depicted.

The image sensor 20 includes an imaging element 211, an A/D converter 212, the signal processing unit 221, the local authentication unit 231, the local authentication data storage unit 232, the data transmission decision unit 233, the selector 250, a data transmission unit 261, a data reception unit 262, and a light emission controlling unit 271. Meanwhile, the server apparatus 40 includes a data reception unit 410, a server authentication unit (second authentication unit) 420, a server authentication data storage unit 430, and a data transmission unit 440.

The imaging element 211 converts a light signal of light received from an imaging target into an electric signal. The A/D converter 212 converts the electric signal from an analog signal into a digital signal and outputs the digital signal. The signal processing unit 221 performs various kinds of signal processing for an output signal (captured image) from the A/D converter 212 and outputs a signal (captured image) after the processing. Here, an example of the signal processing performed by the signal processing unit 221 is described. However, all of the signal processing described below may not necessarily be performed by the signal processing unit 221, and only part of the signal processing may be performed by the signal processing unit 221 or processing different from the signal processing may be performed by the signal processing unit 221.

Figure 9:
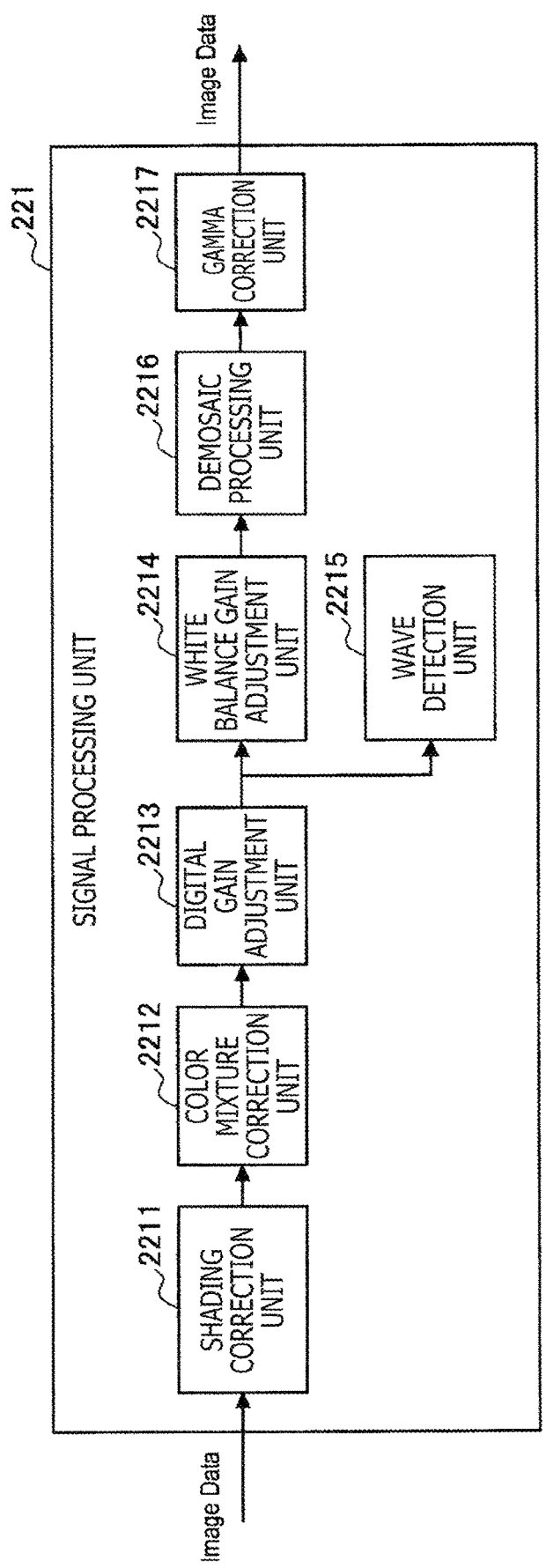
FIG. 9 is a view depicting a detailed configuration example of a signal processing unit.

FIG. 9 is a view depicting a detailed configuration example of the signal processing unit 221. As depicted in FIG. 5, the signal processing unit 221 may include a shading correction unit 2211 that performs shading correction, a color mixture correction unit 2212 that performs color mixture correction, and a digital gain adjustment unit 2213 that performs digital gain adjustment. Further, the signal processing unit 221 may include a white balance gain adjustment unit 2214 that adjusts a white balance gain, a wave detection unit 2215 that performs wave detection, a demosaic processing unit 2216 that performs demosaic processing, and a gamma correction unit 2217 that performs gamma correction.

Figure 10:
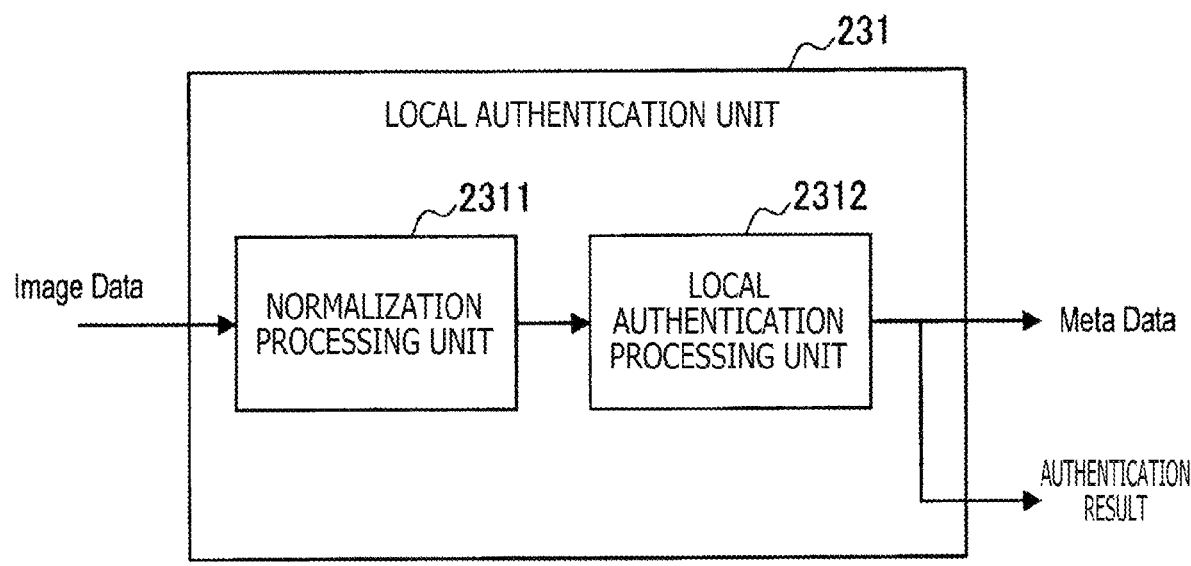
FIG. 10 is a view depicting a detailed configuration example of a local authentication unit.

Description is continued referring back to FIG. 8. The signal (captured image) after the processing by the signal processing unit 221 is outputted to the selector 250, the data transmission decision unit 233, and the local authentication unit 231. First, a detailed configuration example of the local authentication unit 231 is described. FIG. 10 is a view depicting a detailed configuration example of the local authentication unit 231. As depicted in FIG. 10, the local authentication unit 231 includes a normalization processing unit 2311 and a local authentication processing unit 2312.

The normalization processing unit 2311 performs preprocessing necessary for processing by the local authentication processing unit 2312 (for example, a neural network). For example, the preprocessing may be range adjustment, size adjustment, and so forth of a second captured image. The local authentication processing unit 2312 performs first authentication on the basis of the second captured image in the case where emission of light from the LED 361 is detected from within the first captured image. For example, data obtained by the first authentication may be data (metadata) based on the second captured image. Such metadata may be identification information of the imaging target (person) identified from the second captured image.

It is to be noted that the local authentication unit 231 may include a neural network that has undergone machine learning (first neural network). It is supposed that this increases authentication accuracy. For example, the neural network may be a deep learning network. In such a case as just described, it is supposed that the authentication accuracy is further increased. However, the first authentication by the local authentication unit 231 may be performed by a configuration that does not require learning. An authentication result (success/failure) of the first authentication and data (metadata) obtained by the first authentication are outputted to the selector 250.

Figure 11:
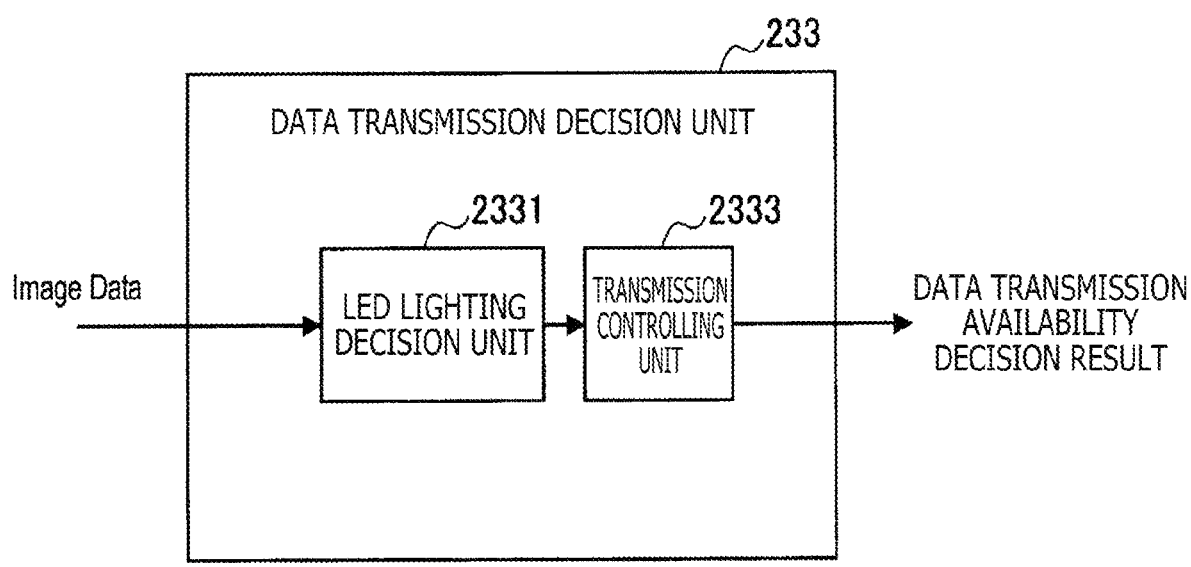
FIG. 11 is a view depicting a detailed configuration example of a data transmission decision unit.

Now, a detailed configuration example of the data transmission decision unit 233 is described. FIG. 11 is a view depicting a detailed configuration example of the data transmission decision unit 233. As depicted in FIG. 11, the data transmission decision unit 233 includes an LED lighting decision unit 2331 and a transmission controlling unit 2333.

The embodiments of the present disclosure principally assume a case in which the data transmission decision unit 233 performs processing for each frame (captured image) of a video inputted from the signal processing unit 221. However, the target of processing by the data transmission decision unit 233 is not limited to each frame (captured image) of the video inputted from the signal processing unit 221 but may be each set of multiple frames. Here, a frame inputted to the data transmission decision unit 233 at a certain timing is referred to as a "first captured image," and a frame inputted to the data transmission decision unit 233 later than the first captured image is referred to as a "second captured image."

First, a first captured image captured by the imaging element 211 is inputted to the data transmission decision unit 233. The light emission controlling unit 271 controls the LED 361 to start emission of light. It is to be noted that, although the light emission controlling unit 271 may control the LED 361 to start emission of light unconditionally, it may control the LED 361 otherwise to start emission of light only in a predetermined case. For example, the predetermined condition may be a case in which the metadata includes personal information (for example, name, sex, age, or the like of the imaging target). The LED lighting decision unit 2331 decides whether or not emission of light from the LED 361 is detected from within the first captured image. Emission of light from the LED 361 is detected if there is no abnormality while, if there is any abnormality, emission of light from the LED 361 is not detected. Although the cause of the abnormality is not restricted specifically, the cause may be that the LED 361 is covered with a cover or that the LED 361 is removed.

Then, a second captured image captured by the imaging element 211 is inputted to the data transmission decision unit 233. The transmission controlling unit 2333 controls, when emission of light from the LED 361 is detected by the LED lighting decision unit 2331, transmission of the second captured image or data (metadata) based on the second captured image to the server apparatus 40. It is to be noted that it is sufficient if the transmission controlling unit 2333 controls which one of the second captured image or the metadata based on the second captured image is to be transmitted from the selector 250, so that either one of them is transmitted to the server apparatus 40.

According to such a configuration as described above, it is possible to control transmission of a second captured image obtained by imaging of an imaging target or metadata of the second captured image to the outside of the image sensor 20. This makes it possible to further enhance the privacy protection of the imaging target. On the other hand, the transmission controlling unit 2333 may discard the second captured image when emission of light from the LED 361 is not detected by the LED lighting decision unit 2331.

For example, it is sufficient if the LED lighting decision unit 2331 decides whether or not emission of light from the LED 361 is detected on the basis of an inter-region difference in luminance in the first captured image or an inter-frame difference in luminance in multiple frames including the first captured image. For example, the LED lighting decision unit 2331 may decide that emission of light from the LED 361 is detected in the case where the inter-region difference in luminance in the first captured image (for example, a difference in luminance between the light detection region IM2 and another region) or the inter-frame difference in luminance in multiple frames (for example, a difference in luminance in the light detection region IM2 in multiple frames) is higher than a threshold value.

Here, principally supposed is a case in which, in the case where emission of light is detected from within the first captured image, the second and subsequent captured images are transmitted to the server apparatus 40. However, in addition to the second and subsequent captured images, the first captured image from within which emission of light is detected may also be transmitted to the server apparatus 40. More particularly, the transmission controlling unit 2333 may control, when emission of light is detected from within a first region (for example, the light detection region IM2 (FIG. 7)) of the first captured image, transmission of a second region different from the first region of the first captured image (for example, the effective pixel region IM1 (FIG. 7)) or data based on the second region. At this time, if reading out of the captured image IM0 is performed sequentially beginning with a row on the light detection region IM2 side (in the example depicted in FIG. 7, the lowermost row), detection of emission of light from the LED 361 and transmission of the effective pixel region IM1 can be performed by single-time reading from the captured image IM0.

For example, it is sufficient if, in the case where the first authentication by the local authentication unit 231 results in success, the transmission controlling unit 2333 controls transmission of data (metadata) based on the second captured image to the server apparatus 40. On the other hand, it is sufficient that, in the case where the first authentication by the local authentication unit 231 results in failure, the transmission controlling unit 2333 controls transmission of the second captured image to the server apparatus 40.

Emission of light from the LED 361 may be detected using a neural network that has undergone machine learning (third neural network). It is supposed that this increases detection accuracy of emission of light from the LED 361. For example, the neural network may be a deep learning network. In such a case as just described, it is supposed that the detection accuracy of emission of light from the LED 361 is further increased. However, emission of light from the LED 361 may be extracted by a configuration that does not require learning. It is to be noted that the neural network that has undergone machine learning (third neural network) can be included in the data transmission decision unit 233.

The second captured image or the data (metadata) based on the second captured image is transmitted to the server apparatus 40 by the data transmission unit 261 under the control of the data transmission decision unit 233. In the server apparatus 40, the second captured image or the data (metadata) based on the second captured image is received by the data reception unit 410. The server authentication unit 420 performs second authentication based on the second captured image. For example, data obtained by the second authentication may be the data (metadata) based on the second captured image. Such metadata may be identification information of the imaging target (person) identified from the second captured image.

It is to be noted that the server authentication unit 420 may include a neural network that has undergone machine learning (second neural network). It is supposed that this increases the authentication accuracy. For example, the neural network may be a deep learning network. In such a case as just described, it is supposed that the authentication accuracy is further increased. However, the second authentication by the server authentication unit 420 may be performed by a configuration that does not require learning. An authentication result (success/failure) of the second authentication and data (metadata) obtained by the second authentication are transmitted to the image sensor 20 through the data transmission unit 440.

In the image sensor 20, the authentication result (success/failure) of the second authentication and the data (metadata) obtained by the second authentication are received by the data reception unit 262.

In the case where the first authentication results in success, processing based on the data (metadata) obtained by the first authentication is performed by the image sensor 20. Also in the case where the second authentication results in success, processing based on the data (metadata) obtained by the second authentication is performed by the image sensor 20. The processing based on the metadata is not restrictive. For example, in the case where the metadata is identification information of an imaging target, the processing based on the metadata may be processing for displaying an avatar corresponding to the imaging target identified based on the identification information on a screen.

It is to be noted that there is the possibility that a second parameter of the second neural network included in the server authentication unit 420 may contribute more to high recognition accuracy than a first parameter of the first neural network included in the local authentication unit 231. As a parameter, a weight, a bias, or the like is supposed. Therefore, it is desirable to update the first parameter of the first neural network included in the local authentication unit 231 at a predetermined timing on the basis of the second parameter of the second neural network included in the server authentication unit 420.

In particular, in the case where the second authentication based on the second captured image by the server authentication unit 420 results in success, the second parameter of the second neural network included in the server authentication unit 420 may be acquired from the server authentication data storage unit 430 by the server authentication unit 420 and transmitted to the image sensor 20 through the data transmission unit 440. At this time, in the image sensor 20, the second parameter is received by the data reception unit 262, and the first parameter, which is stored in the local authentication data storage unit 232, of the first neural network included in the local authentication unit 231 may be updated on the basis of the second parameter by the local authentication unit 231.

Figure 12:
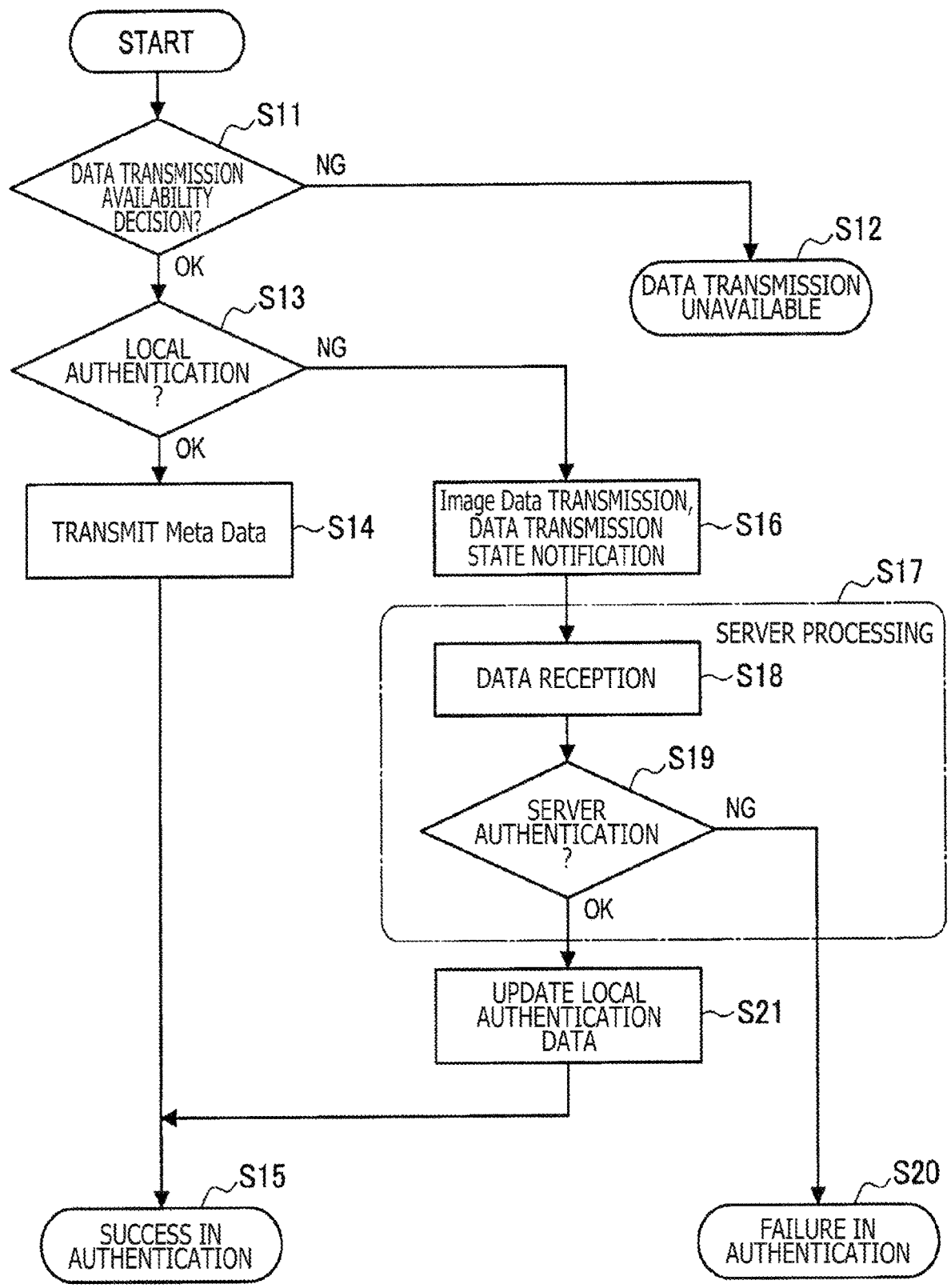
FIG. 12 is a flow chart depicting an operation example of the image sensor according to the first embodiment of the present disclosure.

Subsequently, an operation example of the image sensor 20 according to the first embodiment of the present disclosure is described. FIG. 12 is a flow chart depicting the operation example of the image sensor 20 according to the first embodiment of the present disclosure. As depicted in FIG. 12, the data transmission decision unit 233 decides data transmission availability (S11). The data transmission availability decision is described in detail with reference to FIG. 13.

Figure 13:
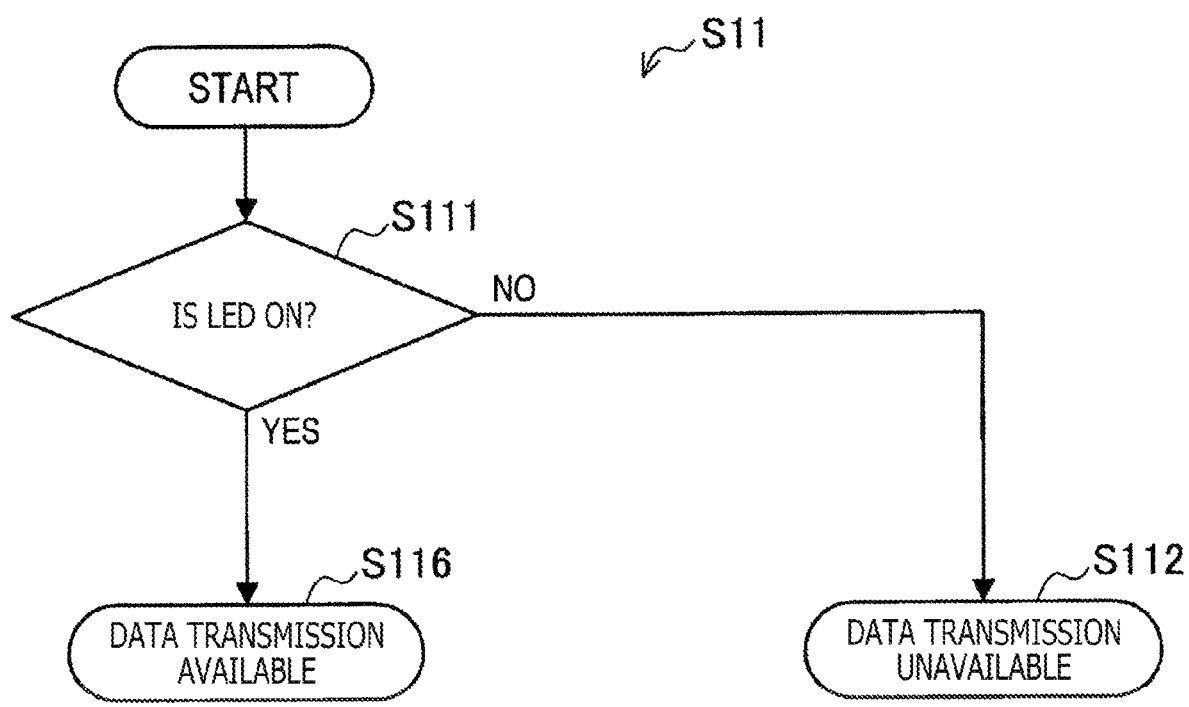
FIG. 13 is a flow chart depicting a detailed operation example of data transmission availability decision according to the embodiment.

FIG. 13 is a flow chart depicting a detailed operation example of the data transmission availability decision according to the first embodiment of the present disclosure. First, the light emission controlling unit 271 controls the LED 361 to start emission of light together with starting of imaging. Then, as depicted in FIG. 13, in a data transmission availability decision S11, the data transmission decision unit 233 tries to detect light emitted from the LED 361 from within a captured image (S111). In the case where light emitted from the LED 361 is not detected ("NO" at S111), the data transmission decision unit 233 decides that data transmission is unavailable (S112). On the other hand, in the case where light emitted from the LED 361 is detected ("YES" at S111), the data transmission decision unit 233 decides that data transmission is available. (S116).

Description is continued referring back to FIG. 12. In the case where it is decided that data transmission is unavailable ("NG" at S11), data transmission is unavailable (S12). At this time, the captured image may be discarded. On the other hand, in the case where it is decided that data transmission is available ("OK" at S11), the local authentication unit 231 performs local authentication (S13). The local authentication can correspond to the first authentication described above. In the case where the local authentication results in success ("OK" at S13), the metadata is transmitted to the server apparatus 40 by the data transmission unit 261 (S14), resulting in success in authentication (S15). On the other hand, in the case where the local authentication results in failure ("NG" at S13), the captured image is transmitted to the server apparatus 40 by the data transmission unit 261. At this time, a notification representing a data transmission state may be issued (S16).

Then, server processing by the server apparatus 40 is performed (S17). In particular, the captured image is received by the data transmission unit 440 (S18), and server authentication is performed on the basis of the captured image (S19). The server authentication can correspond to the second authentication described above. In the case where the server authentication results in success ("OK" at S19), the local authentication data is updated with the server authentication data (S21), resulting in success in authentication (S15). On the other hand, in the case where the server authentication results in failure ("NG" at S19), the authentication results in failure (S20).

It is to be noted that, after the transmission of the metadata or the captured image is completed, the light emission controlling unit 271 may control the LED 361 to stop the emission of light. This acts to avoid that metadata or a captured image is transmitted successively although an image of the same person is captured. Then, in the case where a person is newly detected from within the imaging range, the light emission controlling unit 271 may control the LED 361 to start emission of light again. By this, in the case where image capturing of the new person is started, transmission of metadata or a captured image is started again.

The first embodiment of the present disclosure is such as described above.

2. Second Embodiment

Figure 14:
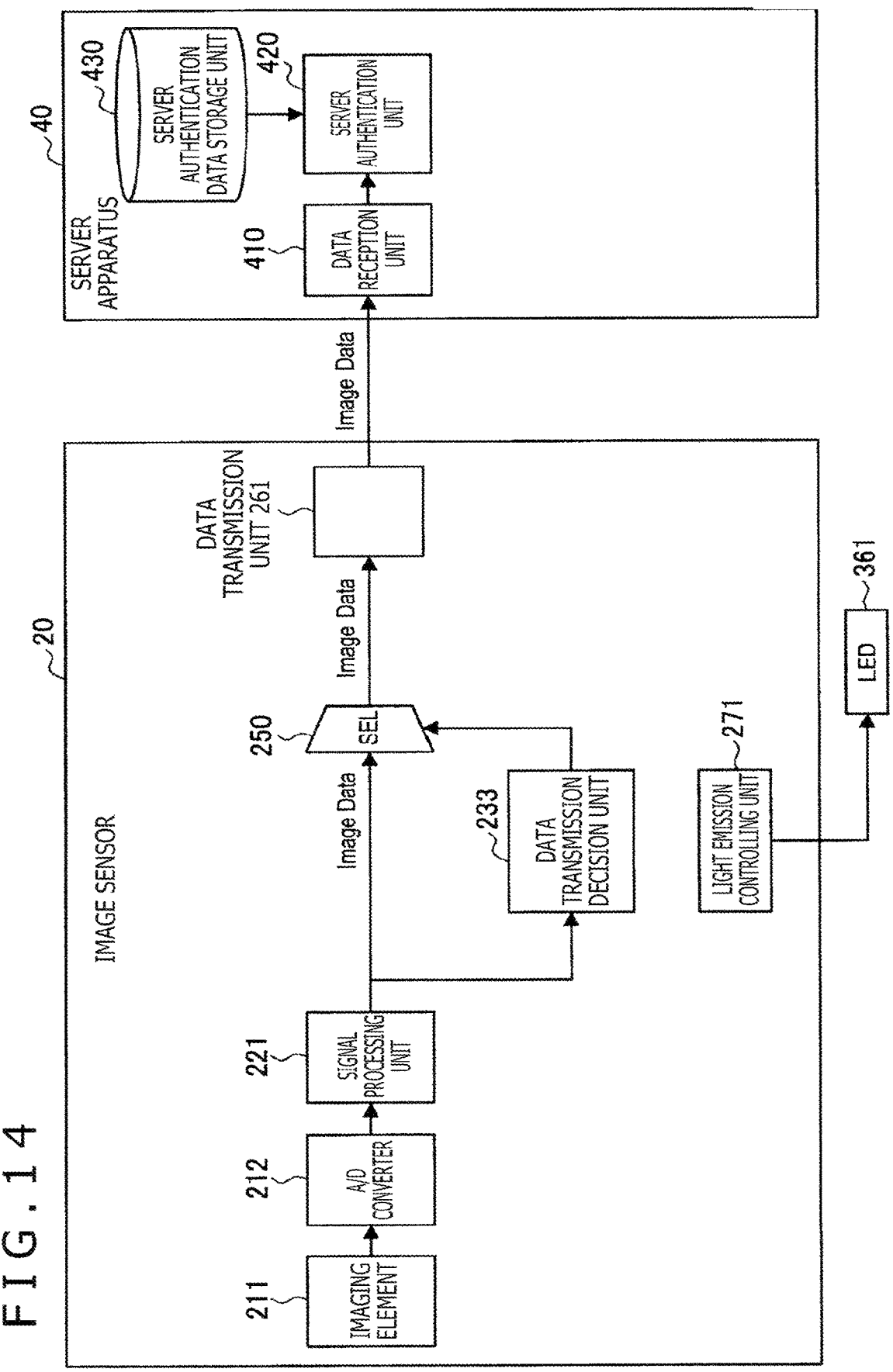
FIG. 14 is a view depicting a detailed configuration example of a solid-state imaging system according to a second embodiment of the present disclosure.

Subsequently, a second embodiment of the present disclosure is described. A detailed configuration of a solid-state imaging system 1 according to the second embodiment of the present disclosure is described. FIG. 14 is a view depicting a detailed configuration example of the solid-state imaging system 1 according to the second embodiment of the present disclosure. As depicted in FIG. 14, the second embodiment of the present disclosure is different from the first embodiment of the present disclosure in that the image sensor 20 does not include the local authentication unit 231 and the local authentication data storage unit 232. In this case, metadata is not transmitted from the image sensor 20 to the server apparatus 40.

Figure 15:
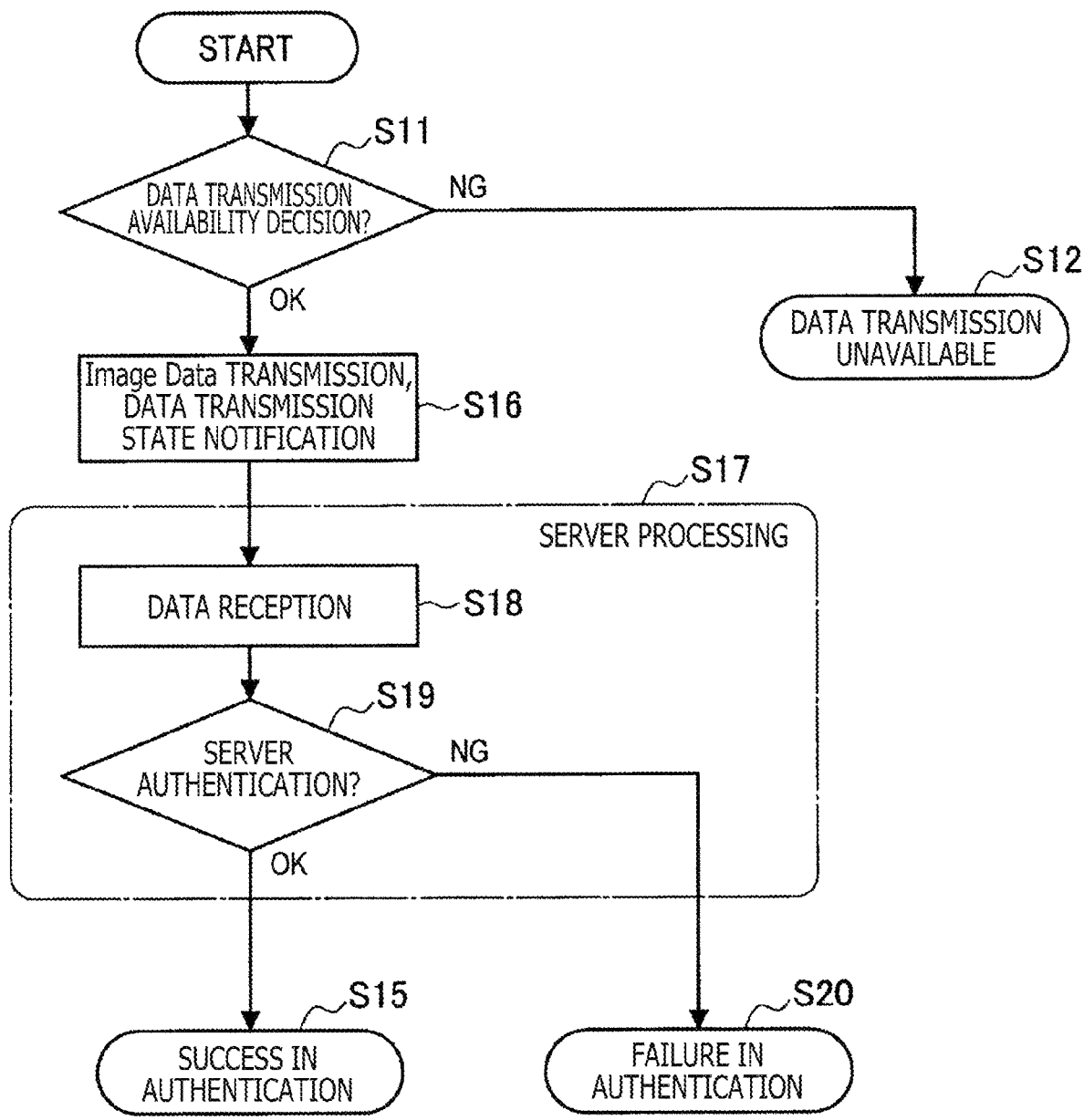
FIG. 15 is a flow chart depicting an operation example of an image sensor according to the embodiment.

Subsequently, an operation example of the image sensor 20 according to the second embodiment of the present disclosure is described. FIG. 15 is a flow chart depicting an operation example of the image sensor 20 according to the second embodiment of the present disclosure. As depicted in FIG. 15, different from the example depicted in FIG. 12, in the case where it is decided that data transmission is available ("OK" at S11), a captured image is transmitted to the server apparatus 40 by the data transmission unit 261. At this time, a notification representing a data transmission state may be issued (S16).

Then, server processing by the server apparatus 40 is performed (S17). In particular, the captured image is received by the data transmission unit 440 (S18), and server authentication is performed on the basis of the captured image (S19). The server authentication can correspond to the second authentication described above. In the case where the server authentication results in success ("OK" at S19), the authentication results in success (S15). On the other hand, in the case where the server authentication results in failure ("NG" at S19), the authentication results in failure (S20).

The second embodiment of the present disclosure is such as described above.

3. Third Embodiment

Figure 16:
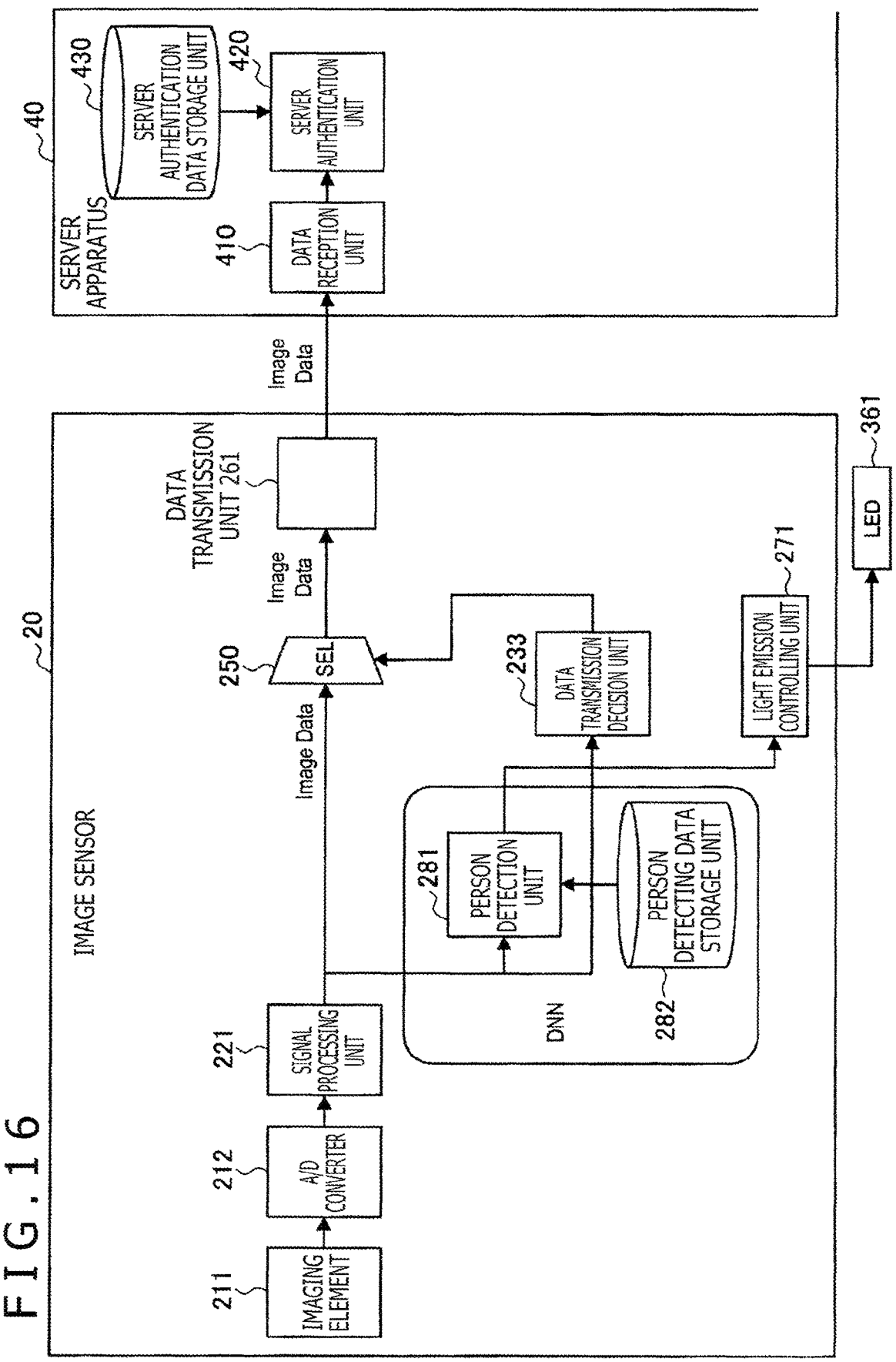
FIG. 16 is a view depicting a detailed configuration example of a solid-state imaging system according to a third embodiment of the present disclosure.

Subsequently, a third embodiment of the present disclosure is described. A detailed configuration of a solid-state imaging system 1 according to the third embodiment of the present disclosure is described. FIG. 16 is a view depicting a detailed configuration example of the solid-state imaging system 1 according to the third embodiment of the present disclosure. As depicted in FIG. 16, the third embodiment of the present disclosure is different from the second embodiment of the present disclosure in that the solid-state imaging system 1 includes a person detection unit 281 and a person detection data storage unit 282. In this case, a signal (captured image) that has undergone the processing by the signal processing unit 221 is outputted also to the person detection unit 281. It is to be noted that the solid-state imaging system 1 may include, in addition to the person detection unit 281 and the person detection data storage unit 282, a person detection unit 281 and a person detection data storage unit 282 similarly as in the first embodiment.

The person detection unit 281 tries to detect a person from within a first captured image. For example, in the case where a feature amount of a person is stored in the person detection data storage unit 282, the person detection unit 281 acquires the feature amount of the person from the person detection data storage unit 282 and extracts a feature amount from within the first captured image. In the case where the two feature amounts are coincident with or similar to each other, the person detection unit 281 may detect that a person exists in the first captured image. In the case where a person is detected from within the first captured image by the person detection unit 281, the light emission controlling unit 271 controls the LED 361 to start emission of light. Consequently, since the LED 361 lights up only when there is the possibility that lighting of the LED 361 is viewed by a person, power saving is achieved.

In the case where a person is detected from within the first captured image, the person detection unit 281 may notify the transmission controlling unit 2333 of a person detection region (face region). Then, after masking processing is performed for the person detection region (face region) in the second captured image, the transmission controlling unit 2333 may control such that the second captured image is transmitted to the server apparatus 40. By this, the privacy protection of the person in the second captured image can be enhanced.

It is to be noted that the feature amount may be extracted from within the first captured image by using a neural network that has undergone machine learning (fourth neural network). It is supposed that this increases accuracy in feature amount extraction. For example, the neural network may be a deep learning network. In such a case as just described, it is supposed that the accuracy in feature amount extraction is further increased. However, the feature amount may be extracted by a configuration that does not require learning. It is to be noted that the neural network that has undergone machine learning (fourth neural network) can be included in the person detection unit 281.

Figure 17:
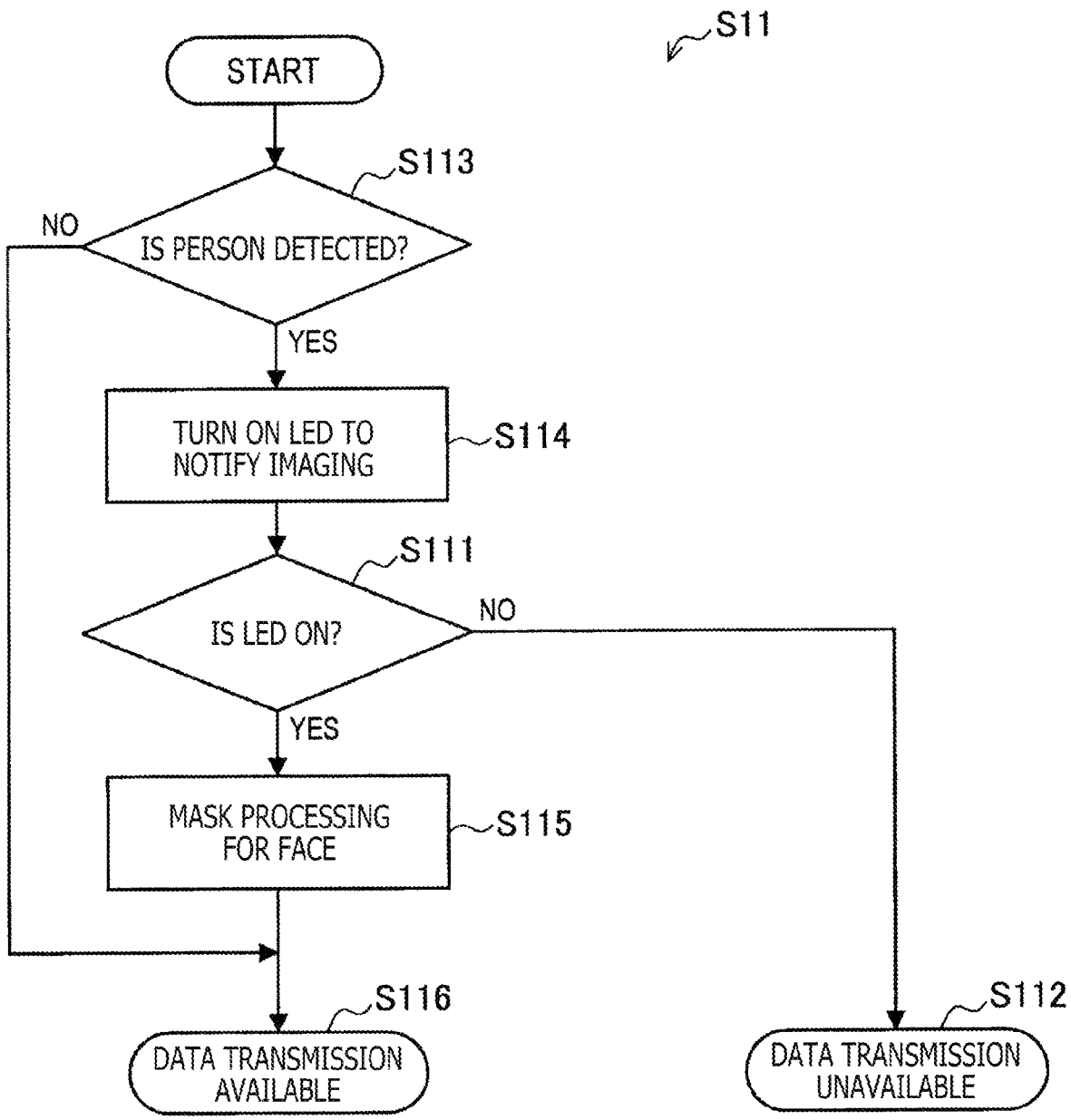
FIG. 17 is a flow chart depicting a detailed operation example of data transmission availability decision according to the embodiment.

Subsequently, data transmission availability decision according to the third embodiment of the present disclosure is described in detail with reference to FIG. 17. FIG. 17 is a flow chart depicting a detailed operation example of the data transmission availability decision according to the third embodiment of the present disclosure. First, the person detection unit 281 tries to find whether or not a person is detected from within a captured image (S113). In the case where a person is not detected by the person detection unit 281 ("NO" at S113), the data transmission decision unit 233 decides that data transmission is available (S116). On the other hand, in the case where a person is detected by the person detection unit 281 ("YES" at S113), the light emission controlling unit 271 controls the LED 361 to start emission of light to notify the imaging target of start of imaging (S114).

Then, the data transmission decision unit 233 tries to detect light emitted from the LED 361 from within the captured image (S111). In the case where light emitted from the LED 361 is not detected ("NO" at S111), the data transmission decision unit 233 decides that data transmission is unavailable (S112). On the other hand, in the case where light emitted from the LED 361 is detected ("YES" at S111), the data transmission decision unit 233 performs masking processing for the face region of the captured image (S115) and decides that data transmission is available (S116).

The third embodiment of the present disclosure is such as described above.

4. Fourth Embodiment

Figure 18:
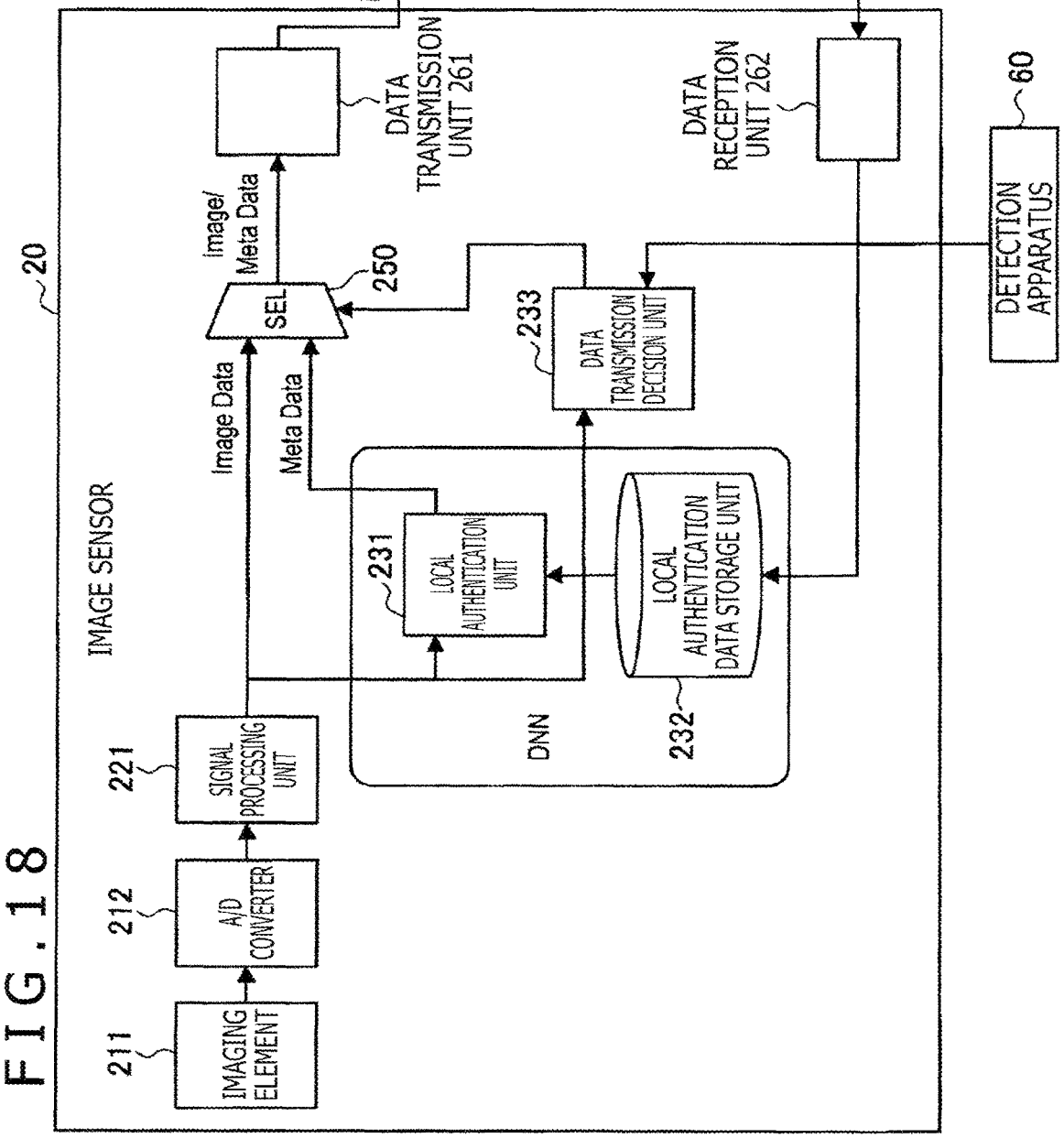
FIG. 18 is a view depicting a detailed configuration example of a solid-state imaging system according to a fourth embodiment of the present disclosure.

Subsequently, a fourth embodiment of the present disclosure is described. A detailed configuration of a solid-state imaging system 1 according to the fourth embodiment of the present disclosure is described. FIG. 18 is a view depicting a detailed configuration example of the solid-state imaging system 1 according to the fourth embodiment of the present disclosure. As depicted in FIG. 18, the fourth embodiment of the present disclosure is different from the first embodiment of the present disclosure in that the solid-state imaging system 1 includes a detection apparatus 60. In this case, an imaging permission operation by an imaging target can be detected by the detection apparatus 60. For example, in the case where the detection apparatus 60 includes a microphone, as the imaging permission operation, utterance of a predetermined voice may be used in place of detection of emission of light from the LED 361. Alternatively, in the case where the detection apparatus 60 includes an inputting device (for example, a touch panel or the like), as the imaging permission operation, a predetermined inputting operation (for example, a touch operation with the touch panel or the like) may be used.

The fourth embodiment of the present disclosure is such as described above.

5. Fifth Embodiment

Figure 19:
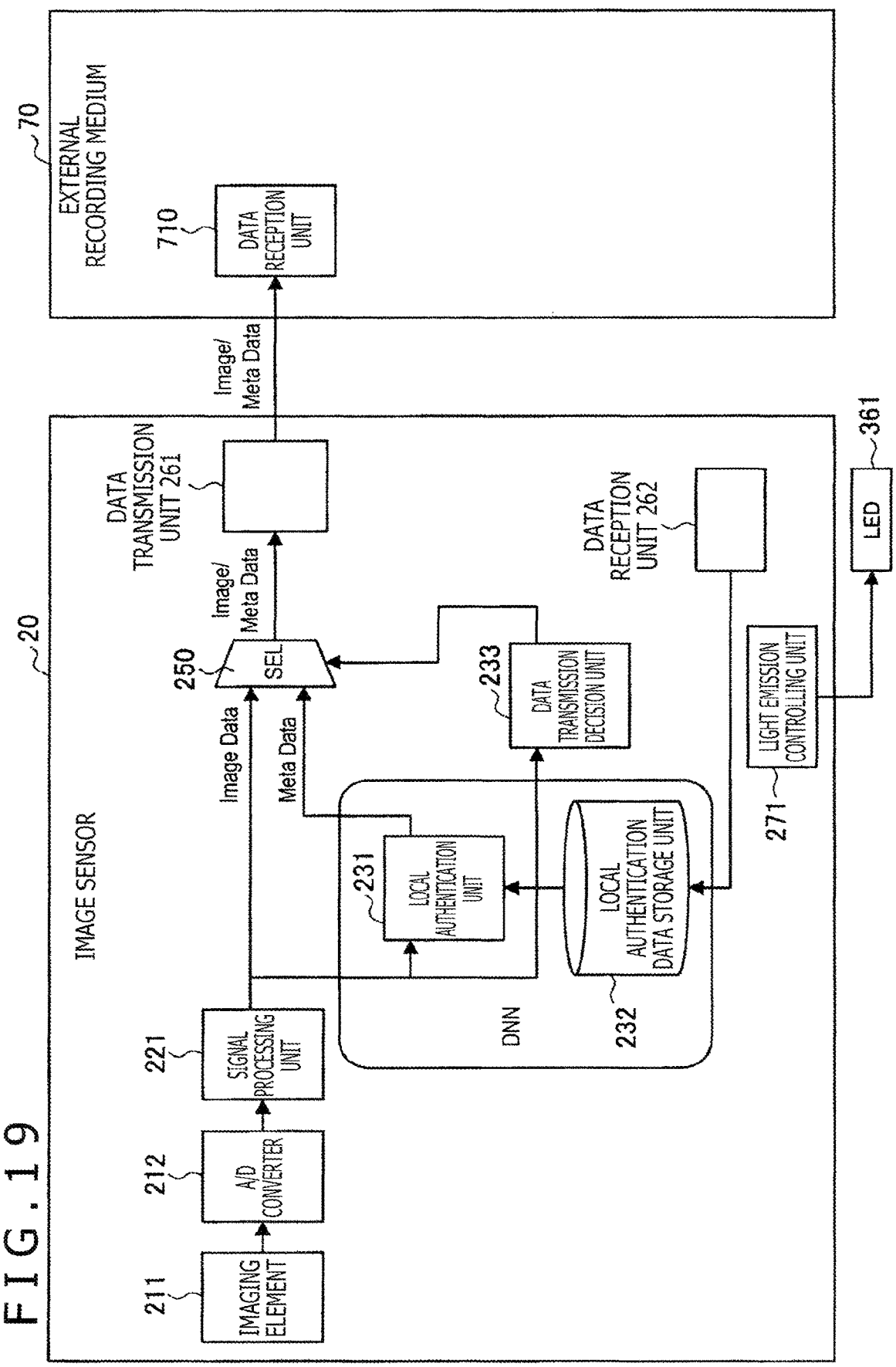
FIG. 19 is a view depicting a detailed configuration example of a solid-state imaging system according to a fifth embodiment of the present disclosure.

Subsequently, a fifth embodiment of the present disclosure is described. A detailed configuration of the solid-state imaging system 1 according to the fifth embodiment of the present disclosure is described. FIG. 19 is a view depicting a detailed configuration example of the solid-state imaging system 1 according to the fifth embodiment of the present disclosure. As depicted in FIG. 19, the fifth embodiment of the present disclosure is different from the first embodiment of the present disclosure in that the solid-state imaging system 1 includes an external recording medium 70 in place of the server apparatus 40. In this case, a second captured image or data (metadata) based on the second captured image transmitted from the image sensor 20 may be recorded on the external recording medium 70. It is to be noted that the second captured image or the data (metadata) based on the second captured image may be outputted from the image sensor 20 to the application 30.

The fifth embodiment of the present disclosure is such as described above.

6. Sixth Embodiment

Subsequently, a sixth embodiment of the present disclosure is described. Here, the embodiments from the first embodiment to the fifth embodiment of the present disclosure have been described principally in connection with a case in which the LED 361 is used as an example of the light emitting unit. Further, it has been described that the embodiments from the first embodiment to the fifth embodiment of the present disclosure can each be applied also to a case in which another light emitting unit (such as a flash) is used in place of the LED 361. In the sixth embodiment of the present disclosure, principally an example of a case in which a flash is used as an example of the light emitting unit is described.

Figure 20:
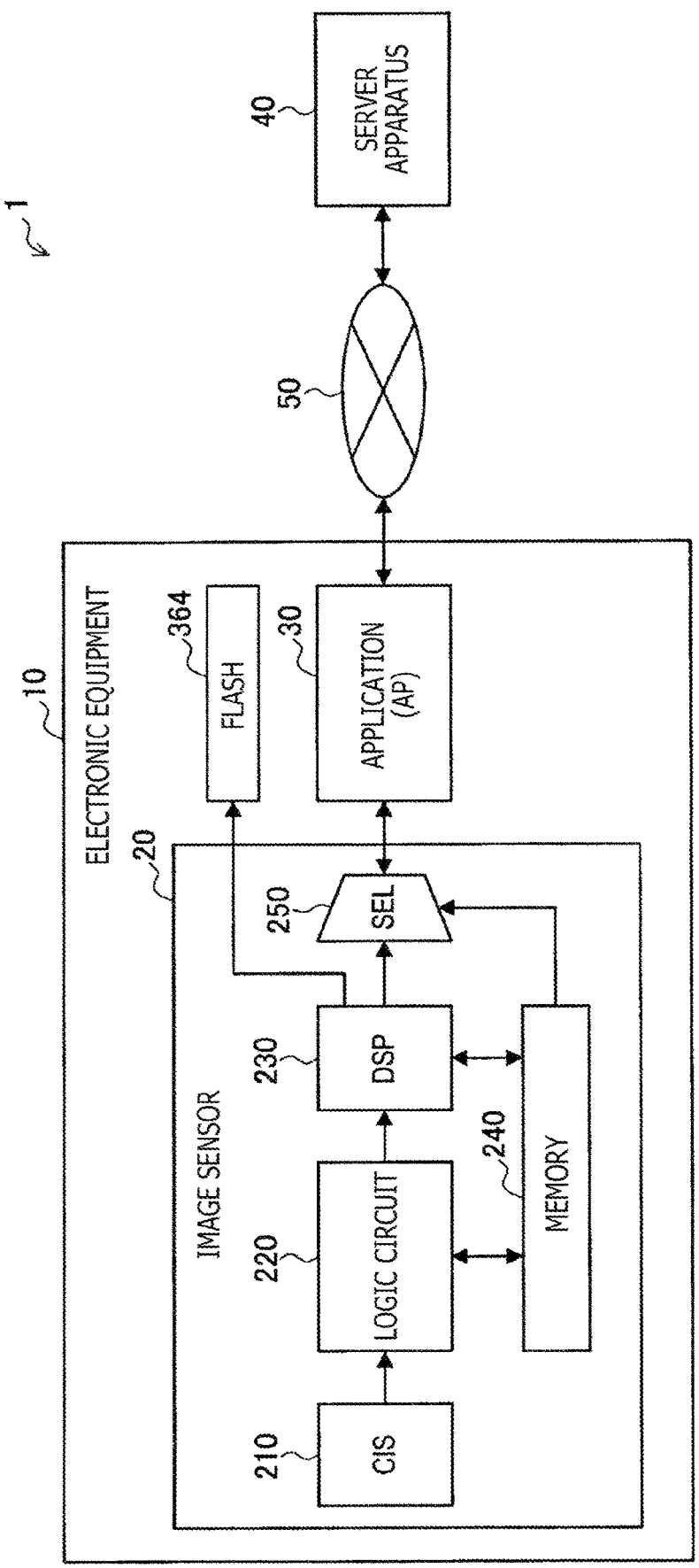
FIG. 20 is a view depicting a detailed configuration example of a solid-state imaging system according to a sixth embodiment of the present disclosure.

A configuration example of a solid-state imaging system according to the sixth embodiment of the present disclosure is described with reference to FIG. 20. Referring to FIG. 20, a solid-state imaging system 1 according to the sixth embodiment of the present disclosure is different from the solid-state imaging system 1 according to the first embodiment of the present disclosure in that the electronic equipment 10 includes a flash 364 in place of the LED 361. The flash 364 emits light upon imaging by the image sensor 20 under the control of the DSP 230. At this time, exposure control according to an intensity of light (flash intensity) emitted from the flash 364 disposed inside the image sensor 20 is performed.

Figure 21:
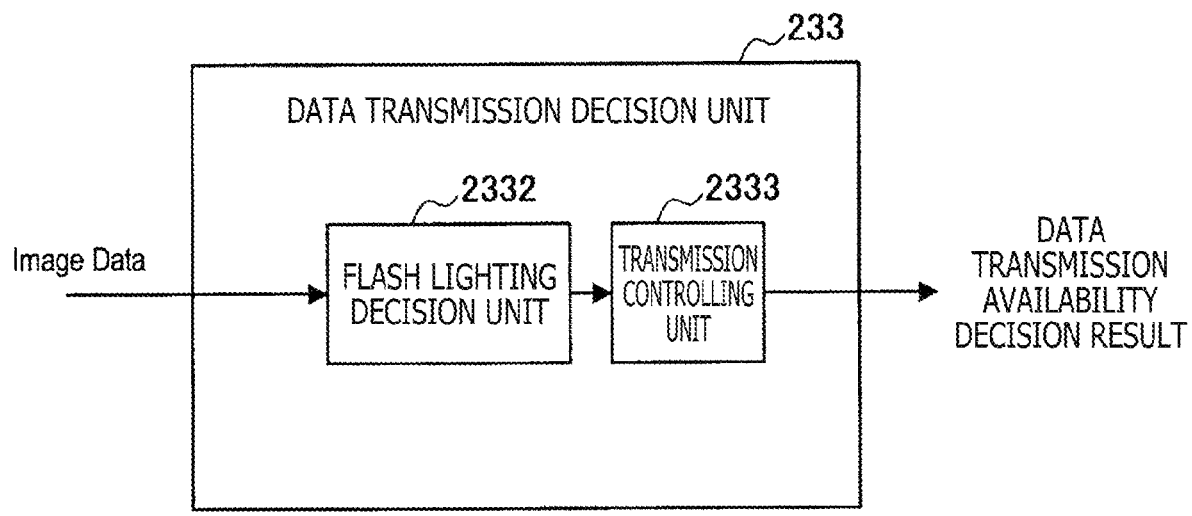
FIG. 21 is a view depicting a detailed configuration example of a data transmission decision unit.

Subsequently, a detailed configuration example of the solid-state imaging system 1 according to the sixth embodiment of the present disclosure is described. FIG. 21 is a view depicting a detailed configuration example of the data transmission decision unit 233. As depicted in FIG. 21, the data transmission decision unit 233 includes a flash lighting decision unit 2332 and a transmission controlling unit 2333. The image sensor 20 according to the sixth embodiment of the present disclosure is different from the image sensor 20 according to the first embodiment of the present disclosure in that the data transmission decision unit 233 includes the flash lighting decision unit 2332 in place of the LED lighting decision unit 2331.

The light emission controlling unit 271 calculates an appropriate exposure value (exposure time and gain) in the case of the flash not in a light-up state, on the basis of the luminance of the imaging range, before the flash lights up. Then, the light emission controlling unit 271 calculates a parameter (flash intensity, exposure time, gain) in the case of the flash in a light-up state, on the basis of the appropriate exposure value in the case of the flash not in a light-up state. In particular, the light emission controlling unit 271 calculates a parameter with which, in the case where emission of light by the flash 364 is imaged in the first captured image, an average luminance value of the first captured image falls within an appropriate range. The light emission controlling unit 271 controls the flash 364 to emit light on the basis of the parameter.

The flash lighting decision unit 2332 decides whether or not emission of light is detected from within the first captured image, on the basis of whether or not the average luminance value of the first captured image is within the appropriate range. At this time, if there is no specific abnormality, the average luminance value of the first captured image falls within the appropriate range, resulting in appropriate exposure. On the other hand, if there is any abnormality, the average luminance value of the first captured image does not fall within the appropriate range, resulting in underexposure. Although the cause of the abnormality is not specifically restricted, the cause may be that the flash 364 is covered with a cover or that the flash 364 is removed.

Figure 22:
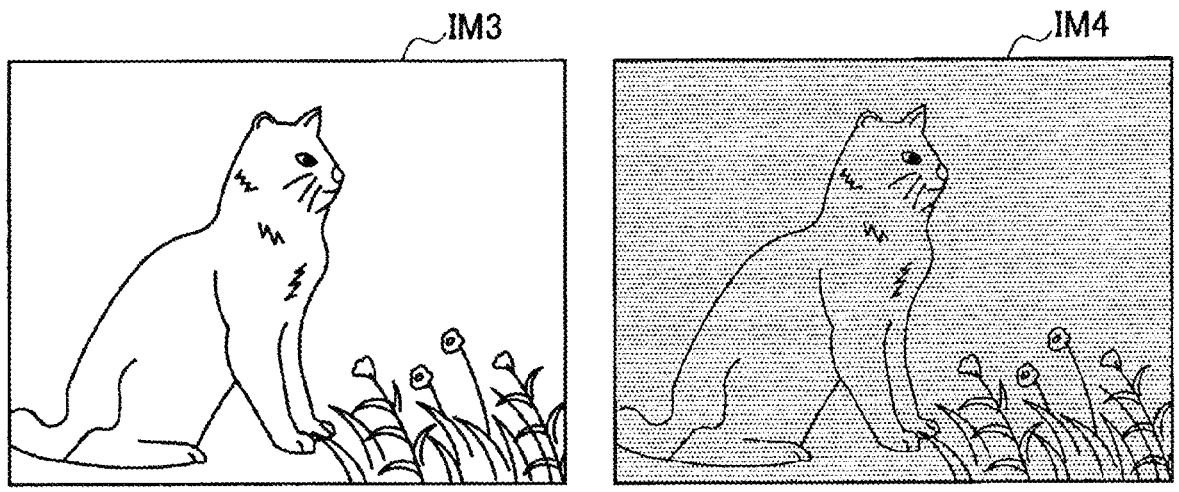
FIG. 22 is a view depicting examples of captured images in the case where a flash normally lights up and the case where the flash does not normally light up.

FIG. 22 is a view depicting examples of captured images in the case where the flash 364 normally lights up and in the case where the flash 364 does not normally light up. Referring to FIG. 22, a captured image IM3 in the case where the flash 364 normally lights up and a captured image IM4 in the case where the flash 364 does not normally light up are depicted. The captured image IM3 in the case where the flash 364 normally lights up has an average luminance value that falls within the appropriate range. On the other hand, the captured image IM4 in the case where the flash 364 does not normally light up has an average luminance value that does not fall within the appropriate range.

The transmission controlling unit 2333 controls transmission of a second captured image or data (metadata) based on the second captured image to the server apparatus 40 when emission of light from the flash 364 is detected by the flash lighting decision unit 2332 (in the example depicted in FIG. 22, when the average luminance value falls within the appropriate range). On the other hand, the transmission controlling unit 2333 may discard the second captured image when emission of light from the flash 364 is not detected by the flash lighting decision unit 2332.

Figure 23:
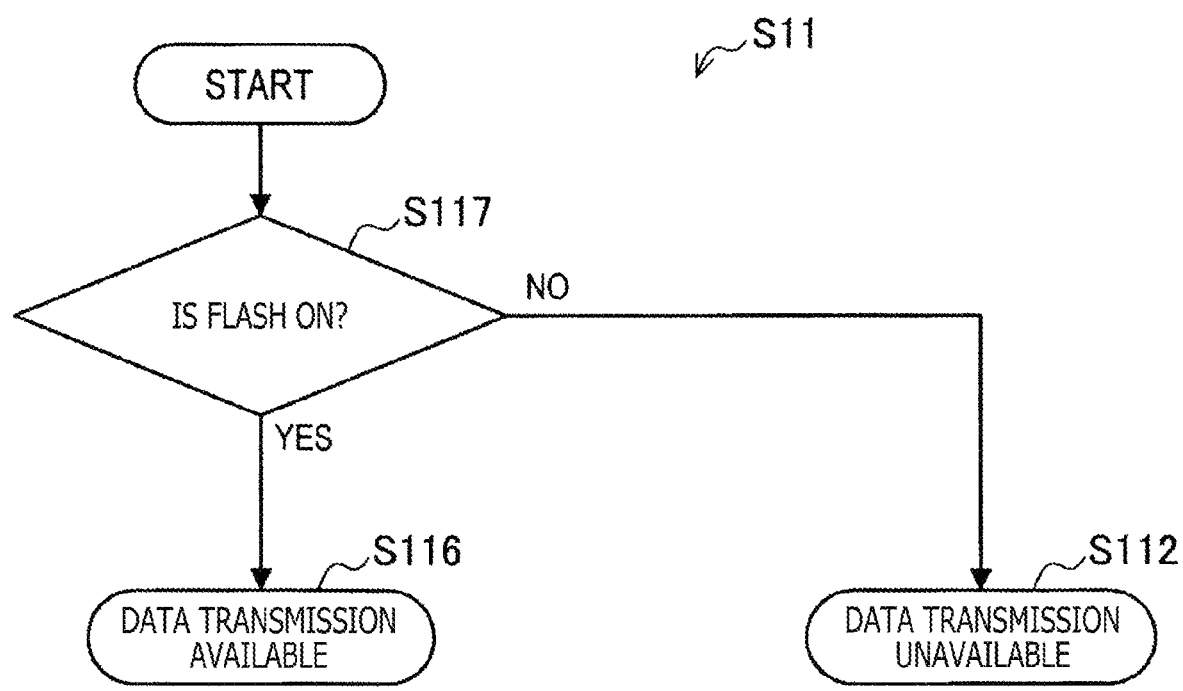
FIG. 23 is a flow chart illustrating a detailed operation example of data transmission availability decision according to the sixth embodiment of the present disclosure.

Subsequently, data transmission availability decision according to the sixth embodiment of the present disclosure is described in detail with reference to FIG. 23. FIG. 23 is a flow chart depicting a detailed operation example of the data transmission availability decision according to the sixth embodiment of the present disclosure. First, the light emission controlling unit 271 controls the flash 364 to start emission of light together with start of imaging. Then, as depicted in FIG. 23, in the data transmission availability decision S11, the data transmission decision unit 233 tries to detect light emitted from the flash 364 with reference to the average luminance value of the captured image (S117). In the case where light emitted from the flash 364 is not detected ("NO" at S117), the data transmission decision unit 233 decides that data transmission is unavailable (S112). On the other hand, in the case where light emitted from the flash 364 is detected ("YES" at S117), the data transmission decision unit 233 decides that data transmission is available (S116).

The sixth embodiment of the present disclosure is such as described above.

7. Conclusion

As described above, according to the embodiments of the present disclosure, there is provided a solid-state imaging device including an imaging unit configured to capture a first captured image, a light emission controlling unit configured to control emission of light from the light emitting unit, a decision unit configured to decide whether or not the emission of light is detected from within the first captured image, and a transmission controlling unit configured to control, when the emission of light is detected, transmission of a second captured image or data based on the second captured image.

According to such a configuration as just described, since transmission of data obtained by imaging of an imaging target to the outside of the image sensor is controlled, privacy protection of the imaging target can be further enhanced.

Although the preferred embodiments of the present disclosure have been described in detail with reference to the accompanying drawings, the technical scope of the present disclosure is not limited to such embodiments. It is apparent that persons who have common knowledge in the technical field of the present disclosure could conceive various alternations or modifications within the scope of the technical idea described in the claims, and it is construed that also they naturally belong to the technical scope of the present disclosure.

For example, in the foregoing description, each of the embodiments from the first embodiment to the sixth embodiment of the present disclosure has been described. From such various embodiments, several configurations may be selectively combined in a suitable manner.

Further, the advantageous effects described in the present specification are explanatory or illustrative to the last and are not restrictive. In short, the technology according to the present disclosure can achieve, in place of or in addition to the advantageous effects described above, other advantageous effects that are apparent to those skilled in the art from the description of the present specification.

It is to be noted that also such configurations as described below fall within the technical scope of the present disclosure.

(1)

A solid-state imaging device including:

an imaging unit configured to capture a first captured image;

a light emission controlling unit configured to control emission of light from the light emitting unit;

a decision unit configured to decide whether or not the emission of light is detected from within the first captured image; and a transmission controlling unit configured to control, when the emission of light is detected, transmission of a second captured image or data based on the second captured image.

(2)

The solid-state imaging device according to (1) above, further including:

a first authentication unit configured to perform, in a case where the emission of light is detected, first authentication on the basis of the second captured image, in which the transmission controlling unit controls, in a case where the first authentication results in success, transmission of the data based on the second captured image and controls, in a case where the first authentication results in failure, transmission of the second captured image.

(3)

The solid-state imaging device according to (2) above, in which the first authentication unit includes a first neural network that has undergone machine learning.

(4)

The solid-state imaging device according to (3) above, in which a second authentication unit including a second neural network that has undergone machine learning exists in a transmission destination of the second captured image, and in a case where second authentication based on the second captured image by the second authentication unit results in success, the first authentication unit updates a first parameter of the first neural network on the basis of a second parameter of the second neural network.

(5)

The solid-state imaging device according to any one of (2) to (4) above, further including:

multiple semiconductor chips, in which the first authentication unit is included in a second semiconductor chip different from a first semiconductor chip that includes the imaging unit, among the multiple semiconductor chips.

(6)

The solid-state imaging device according to (5) above, in which the first authentication unit is implemented by a DSP included in the second semiconductor chip.

(7)

The solid-state imaging device according to (5) or (6) above, further including:

a signal processing unit configured to perform signal processing for an output signal from the imaging unit, in which the signal processing unit is included in a third semiconductor chip different from the first semiconductor chip and the second semiconductor chip or in the second semiconductor chip, among the multiple semiconductor chips.

(8)

The solid-state imaging device according to any one of (5) to (7) above, further including:

a storage unit, in which the storage unit is included in a third semiconductor chip different from the first semiconductor chip and the second semiconductor chip or in the second semiconductor chip, among the multiple semiconductor chips.

(9)

The solid-state imaging device according to any one of (1) to (8) above, in which light emitted from the light emitting unit reaches the imaging unit directly from the light emitting unit or after reflected by a predetermined reflection member.

(10)

The solid-state imaging device according to any one of (1) to (9) above, in which the decision unit decides whether or not the emission of light is detected on the basis of an inter-region difference in luminance in the first captured image or an inter-frame difference in luminance among multiple frames including the first captured image.

(11)

The solid-state imaging device according to any one of (1) to (10) above, in which the light emission controlling unit controls the light emitting unit to start the emission of light in a case where a person is detected from within the first captured image.

(12)

The solid-state imaging device according to any one of (1) to (11) above, in which the transmission controlling unit controls, when the emission of light is detected from a first region of the first captured image, transmission of a second region different from the first region of the first captured image or data based on the second region.

(13)

The solid-state imaging device according to any one of (1) to (11) above, in which the decision unit decides, on the basis of whether or not an average luminance value of the first captured image falls within an appropriate range, whether or not the emission of light is detected from within the first captured image.

(14)

The solid-state imaging device according to (13) above, in which the light emission controlling unit calculates a parameter with which, in a case where the emission of light is imaged in the first captured image, the average luminance value of the first captured image falls within the appropriate range, and controls the emission of light on the basis of the parameter.

(15)

The solid-state imaging device according to any one of (1) to (14) above, in which the transmission controlling unit controls transmission of the second captured image or the data based on the second captured image to an application, a server apparatus, or an external recording medium.

(16)

The solid-state imaging device according to any one of (2) to (8) above, in which, in the case where the first authentication results in success, processing based on data obtained by the first authentication is performed.

(17)

The solid-state imaging device according to (16) above, in which the data obtained by the first authentication includes identification information of an imaging target identified from the second captured image.

(18)

The solid-state imaging device according to (4) above, in which, in the case where the second authentication results in success, processing based on data obtained by the second authentication is performed.

(19)

A solid-state imaging method including:

capturing a first captured image;

controlling emission of light from a light emitting unit;

deciding whether or not the emission of light is detected from within the first captured image; and controlling, when the emission of light is detected, transmission of a second captured image or data based on the second captured image, by a processor.

(20)

Electronic equipment including:

an application;

an imaging unit configured to capture a first captured image;

a light emitting unit;

a light emission controlling unit configured to control emission of light from the light emitting unit;

a decision unit configured to decide whether or not the emission of light is detected from within the first captured image; and a transmission controlling unit configured to control, when the emission of light is detected, transmission of a second captured image or data based on the second captured image.

REFERENCE SIGNS LIST

1: Solid-state imaging system
10: Electronic equipment
20: Image sensor
210: CIS
211: Imaging element
212: A/D converter
220: Logic circuit
221: Signal processing unit
2211: Shading correction unit
2212: Color mixture correction unit
2213: Digital gain adjustment unit
2214: White balance gain adjustment unit
2215: Wave detection unit
2216: Demosaic processing unit
2217: Gamma correction unit
230: DSP
231: Local authentication unit
2311: Normalization processing unit
2312: Local authentication processing unit
232: Local authentication data storage unit
233: Data transmission decision unit
2331: LED lighting decision unit
2332: Flash lighting decision unit
2333: Transmission controlling unit
240: Memory
250: Selector
261: Data transmission unit
262: Data reception unit
271: Light emission controlling unit
281: Person detection unit
282: Person detection data storage unit
30: Application
32: Camera module
321: Optical lens
322: Lens holder
323: Cut filter
324: Module board
36: LED module
361: LED
362: Light source lens
363: Module board
364: Flash
40: Server apparatus
410: Data reception unit
420: Server authentication unit
430: Server authentication data storage unit
440: Data transmission unit
50: Network
60: Detection apparatus
70: External recording medium
L1: First semiconductor chip
L2: Second semiconductor chip
L3: Third semiconductor chip

The invention claimed is:

1. A solid-state imaging device, comprising:
an image sensor configured to capture a first captured image; and
circuitry configured to:
control emission of light from a light source;
determine whether the emission of the light is detected in the first captured image;
perform, based on the determination that the emission of the light is detected, first authentication based on a second captured image;
control, in a case where the first authentication results in success, transmission of data based on the second captured image; and
control, in a case where the first authentication results in failure, transmission of the second captured image.

2. The solid-state imaging device according to claim 1, wherein
the circuitry is further configured to execute a first neural network that has undergone machine learning to perform the first authentication.

3. The solid-state imaging device according to claim 2, wherein
a transmission destination of the second captured image executes a second neural network that has undergone the machine learning, and
in a case where second authentication based on the second captured image by the second neural network results in success, the circuitry is further configured to update a first parameter of the first neural network based on a second parameter of the second neural network.

4. The solid-state imaging device according to claim 1, further comprising: a plurality of semiconductor chips, wherein
the image sensor is in a first semiconductor chip of the plurality of semiconductor chips, and
the circuitry is further configured to execute the first authentication is in a second semiconductor chip of the plurality of semiconductor chips different from the first semiconductor chip.

5. The solid-state imaging device according to claim 4, wherein
the circuitry is further configured to execute the first authentication is a digital signal processor (DSP) in the second semiconductor chip.

6. The solid-state imaging device according to claim 4, further comprising:
a signal processing circuit configured to perform signal processing for an output signal from the image sensor, wherein
the signal processing circuit is in one of a third semiconductor chip of the plurality of semiconductor chips different from the first semiconductor chip and the second semiconductor chip or in the second semiconductor chip.

7. The solid-state imaging device according to claim 4, further comprising: a memory, wherein
the memory is in one of a third semiconductor chip of the plurality of semiconductor chips different from the first semiconductor chip and the second semiconductor chip or in the second semiconductor chip.

8. The solid-state imaging device according to claim 1, wherein
the light emitted from the light source reaches the image sensor one of directly from the light source or after reflected by a reflection member.

9. The solid-state imaging device according to claim 1, wherein
the circuitry is further configured to determine whether the emission of the light is detected based on one of an inter-region difference in luminance in the first captured image or an inter-frame difference in luminance among a plurality of frames including the first captured image.

10. The solid-state imaging device according to claim 1, wherein
the circuitry is further configured to control the light source to start the emission of the light in a case where a person is detected from within the first captured image.

11. The solid-state imaging device according to claim 1, wherein
the circuitry is further configured to control, in a case where the emission of the light is detected from a first region of the first captured image, transmission of one of a second region of the first captured image different from the first region of the first captured image or data based on the second region.

12. The solid-state imaging device according to claim 1, wherein
the circuitry is further configured to determine, based on whether an average luminance value of the first captured image falls within an appropriate range, whether the emission of the light is detected in the first captured image.

13. The solid-state imaging device according to claim 12, wherein the circuitry is further configured to:
calculate a parameter with which the average luminance value of the first captured image falls within the appropriate range in a case where the emission of the light is imaged in the first captured image; and
control the emission of the light based on the parameter.

14. The solid-state imaging device according to claim 1, wherein
the controlling unit circuitry is further configured to control transmission of one of the second captured image or the data obtained from the second captured image to one of an application, a server apparatus, or an external recording medium.

15. The solid-state imaging device according to claim 1, wherein,
in the case where the first authentication results in success, the circuitry is further configured to execute processing based on first data obtained by the first authentication.

16. The solid-state imaging device according to claim 15, wherein the first data obtained by the first authentication includes identification information of an imaging target identified from the second captured image.

17. The solid-state imaging device according to claim 3, wherein,
in the case where the second authentication results in success, the circuitry is further configured to execute processing based on second data obtained by the second authentication.

18. A solid-state imaging method, comprising:
capturing a first captured image;
controlling emission of light from a light source;
determining whether the emission of the light is detected in the first captured image;
performing, based on the determination that the emission of the light is detected, first authentication based on a second captured image;
controlling, in a case where the first authentication results in success, transmission of data based on the second captured image; and
controlling, in a case where the first authentication results in failure, transmission of the second captured image.

19. Electronic equipment, comprising:
an application;
an image sensor configured to capture a first captured image;
a light source; and
circuitry configured to:
control emission of light from the light source;
decide determine whether the emission of the light is detected in the first captured image;
perform, based on the determination that the emission of the light is detected, first authentication based on a second captured image;
control, in a case where the first authentication results in success, transmission of data based on the second captured image; and
control, in a case where the first authentication results in failure, transmission of the second captured image.

20. A solid-state imaging device, comprising:
an image sensor configured to capture a first captured image; and
circuitry configured to:
control emission of light from a light source;
determine whether the emission of the light is detected in the first captured image;
control, based on the determination that the emission of the light is detected, transmission of one of a second captured image or data obtained from the second captured image; and
control, in a case where the emission of the light is detected from a first region of the first captured image, transmission of a second region of the first captured image different from the first region or data obtained from the second region.

* * * * *